United States Patent
Gisquet et al.

(10) Patent No.: US 9,516,342 B2
(45) Date of Patent: Dec. 6, 2016

(54) METHOD AND APPARATUS FOR TRANSITION ENCODING IN VIDEO CODING AND DECODING

(71) Applicant: CANON KABUSHIKI KAISHA, Tokyo (JP)

(72) Inventors: Christophe Gisquet, Rennes (FR); Guillaume Laroche, Melesse (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 167 days.

(21) Appl. No.: 14/572,665

(22) Filed: Dec. 16, 2014

(65) Prior Publication Data

US 2015/0181223 A1 Jun. 25, 2015

(30) Foreign Application Priority Data

Dec. 20, 2013 (GB) .................................. 1322813.5
Jan. 3, 2014 (GB) .................................. 1400086.3
Feb. 28, 2014 (GB) .................................. 1403587.7
Aug. 1, 2014 (GB) .................................. 1413724.4

(51) Int. Cl.
*H04N 19/593* (2014.01)
*H04N 19/70* (2014.01)

(52) U.S. Cl.
CPC ............ *H04N 19/593* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 6,968,089 B2 | 11/2005 | Wang | |
| 2002/0063678 A1 | 5/2002 | Wong | |
| 2004/0252899 A1 | 12/2004 | Wang | |
| 2005/0219255 A1* | 10/2005 | Lin | ........................ G09G 5/026 345/582 |
| 2005/0237995 A1* | 10/2005 | Puranik | ............... H04W 56/002 370/350 |
| 2006/0182358 A1* | 8/2006 | Sekino | ..................... G06K 9/18 382/243 |
| 2008/0187218 A1* | 8/2008 | Strom | ..................... G06T 9/001 382/166 |
| 2009/0060026 A1* | 3/2009 | Park | ........................ G09G 5/14 375/240.01 |
| 2009/0315905 A1* | 12/2009 | Lu | .......................... G06T 15/04 345/555 |
| 2011/0116763 A1* | 5/2011 | Muikaichi | ............ H04N 9/8244 386/245 |
| 2012/0063678 A1 | 3/2012 | Asikainen | |

FOREIGN PATENT DOCUMENTS

| | | |
|---|---|---|
| WO | 2006/022741 A1 | 3/2006 |
| WO | 2014/121206 A1 | 8/2014 |

OTHER PUBLICATIONS

Combined Search and Examination Report, GB Intellectual Property Office, Application No. GB1400086.3, Jun. 17, 2015, pp. 1-4.

* cited by examiner

*Primary Examiner* — Kate Luo
(74) *Attorney, Agent, or Firm* — Canon USA, Inc. I.P. Division

(57) ABSTRACT

The invention is related to video coding and decoding. More precisely, the present invention is dedicated to a coding method investigated in the scope of screen content coding, called palette mode. It particularly concerns the encoding of level values based on the use of patterns to predict the level value in order to avoid their transmission. It has been devised to avoid the transmission of level value when the value may be predicted based on the neighbourhood of the pixel to encode. This neighbourhood is matched against memorized pattern so as to predict the level value due to the repetitive occurrence of these patterns. It proposes to save a pattern table in addition to the palette table. This pattern table is constructed symmetrically by the encoder and the decoder and allows to retrieve some predicted level value and to avoid their transmission.

18 Claims, 29 Drawing Sheets

| | | | | | | | |
|---|---|---|---|---|---|---|---|
| 0 | 0 | 0 | 0 | 0 | 0 | 0 | 0 |
| 0 | 1 | 0 | 0 | 0 | 0 | 0 | 0 |
| 0 | 1 | 0 | 0 | 0 | 0 | 0 | 0 |
| 0 | 1 | 1 | 1 | 1 | 1 | 1 | 0 |
| 0 | 1 | 2 | 2 | 2 | 2 | 2 | 0 |
| 0 | 1 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |

↗ 91

| Pred mode = 0 | Level = 0 | Run = 8 | Pred mode = 0 | Level = 1 | Run = 5 | Pred mode = 0 | Level = 0 | Run = 3 | Pred mode = 0 | Level = 2 | Run = 0 |

↗ 92

| Pred mode = 0 | Level = 1 | Run = 0 | Pred mode = 0 | Level = 0 | Run = 5 | Pred mode = 1 | Run = 31 | Pred mode = 0 | Level = 0 | Run = 4 |

| Palette table | | | |
|---|---|---|---|
| Level | Y | U | V |
| 0 | 245 | 128 | 128 |
| 1 | 0 | 145 | 102 |
| 2 | 135 | 178 | 94 |
| 3 | 180 | 7 | 78 |
| 4 | 235 | 22 | 4 |
| 5 | 80 | 0 | 254 |

Fig. 16.a

| Pattern table | | |
|---|---|---|
| Pattern index | Left Level | Right level |
| PI=0 | 0 | 0 |
| PI=1 | 1 | 0 |
| PI=2 | 2 | 1 |
| PI=3 | 3 | 4 |
| PI=4 | 4 | 4 |
| PI=5 | 5 | 1 |

Fig. 16.b

| Palette table | | | |
|---|---|---|---|
| Level | Y | U | V |
| 0 | 245 | 128 | 128 |
| 1 | 0 | 145 | 102 |
| 2 | 135 | 178 | 94 |
| 3 | 180 | 7 | 78 |
| 4 | 235 | 22 | 4 |
| 5 | 80 | 0 | 254 |

Fig. 17.a

| Pattern position | |
|---|---|
| Left Level | Last position in CU |
| 0 | 55 |
| 1 | 1095 |
| 2 | 204 |
| 3 | 7 |
| 4 | 88 |
| 5 | 3014 |

Fig. 17.b

METHOD AND APPARATUS FOR TRANSITION ENCODING IN VIDEO CODING AND DECODING

REFERENCES TO RELATED APPLICATIONS

This application claims the benefit under 35 U.S.C. §119 (a)-(d) of United Kingdom Patent Applications No. 1322813.5, filed on 20 Dec. 2013, No. 1400086.3, filed on 3 Jan. 2014, No. 1403587.7, filed on 28 Feb. 2014, and No. 1413724.4, filed on 1 Aug. 2014, and all entitled "METHOD AND APPARATUS FOR TRANSITION ENCODING IN VIDEO CODING." The above cited patent applications are incorporated herein by reference in their entirety.

FIELD OF THE INVENTION

The invention is related to video coding and decoding. More precisely, the present invention is dedicated to a coding method investigated in the scope of screen content coding, called palette mode. It particularly concerns the encoding of level values based on the use of patterns to predict the level value in order to avoid their transmission.

It applies more particularly to a mode of coding where a block of pixel is predictively encoded based on a predictor block encoded with, or built from, a so-called palette.

A palette in this document is defined as a look up table having entries associating an index with a value of a pixel. Typically, but not necessary, the value of a pixel is constituted by the value of each colour component associated to the pixel, resulting in a colour palette. On the other hand, the value of a pixel may be made of a single pixel component, resulting in a monochrome palette.

This mode of encoding a block of pixel is generally referred to as Palette coding mode. It is contemplated to adopt this mode, for example, in the Range Extension of the High Efficiency Video Coding (HEVC: ISO/IEC 23008-2 MPEG-H Part 2/ITU-T H.265) international standard.

When encoding an image in a video sequence, the image is first divided into coding entities of pixels of equal size referred to as Coding Tree Block (CTB). The size of a Coding Tree Block is typically 64 by 64 pixels. Each Coding Tree Block may then be broken down into a hierarchical tree of smaller blocks which size may vary and which are the actual blocks of pixels to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residue. Next, this residue is compressed. The actual encoded information of the Coding Unit is made of some information to indicate the way of determining the predictor block and the compressed residue. Best predictor blocks are blocks as similar as possible to the Coding Unit in order to get a small residue that could be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residue.

We focus in this document on a third coding mode called Palette mode. According to the Palette mode, it is possible to define a predictor block for a given Coding Unit as a block of indexes from a palette: for each pixel location in the predictor block, the predictor block contains the index associated with the pixel value in the Palette which is the closest to the value of the pixel having the same location (i.e. colocated) in the coding unit. A residue representing the difference between the predictor block and the coding unit is then calculated and encoded. Entry indexes in the Palette are also known as "levels".

When using the Palette mode, the predictor block of levels has to be transmitted in the bitstream. For this transmission, the predictor block is binary encoded using three syntax elements. A first syntax element, called "Pred mode" allows distinguishing between two encoding modes. In a first mode corresponding to a Pred mode having the value 0 (also known as "copy left mode", "left prediction mode" or "index mode"), the value of the level to be encoded has to be transmitted in the bitstream. In a second mode corresponding to a Pred mode having the value 1, the value of the level to be encoded is obtained from the value of the above pixel in the predictor block. The level does not have to be transmitted.

It is worth noting that while the block of levels is not strictly speaking a part of an image, the word "pixel" is used to refer to an element of this block of levels by analogy.

A second syntax element called "Level" is defined for the transmission of the value of a level in the first mode. The third syntax element, called "Run" is used to encode a repetition value. Considering that the predictor block is scanned from the top left corner to the bottom right corner, row by row from left to right and top to bottom (i.e. the raster scan order), the Run syntax element gives the number of successive pixels in the predictor block having the same encoding. If the Pred mode is 0, this is the number of successive pixels of the predictor block having the same level value. If the Pred mode is 1, this is the number of successive pixels of the predictor block having a level value corresponding to the level value of the above pixel.

SUMMARY OF THE INVENTION

The present invention has been devised to avoid the transmission of level value when the value may be predicted based on the neighbourhood of the pixel to encode. This neighbourhood is matched against memorized pattern so as to predict the level value due to the repetitive occurrence of these patterns.

It proposes to save at least one pattern in, for example, pattern table in addition to the palette table. This pattern table is constructed symmetrically by the encoder and the decoder and allows to retrieve some predicted level value and to avoid their transmission.

According to an aspect of the invention there is provided a method for encoding a block of indexes used for encoding a coding unit of an image according to a palette, each index being related to one of the pixels forming the coding unit, the palette comprising a set of indexes associated to pixel values, wherein the method comprises:

storing at least one pattern constituted by the indexes of at least one neighbour of an index of the block of indexes, said pattern being associated with at least one prediction index corresponding to an index expected at a location in the neighbourhood of the pattern;

identifying for a current index to be encoded in the block of indexes a stored pattern corresponding to the neighbourhood of the current index; and if the index to be encoded corresponds to said prediction index associated to the stored pattern then encoding the index of the current index by reference to the stored pattern.

In an embodiment, said patterns are constituted by the index of the left neighbour of the current index.

In an embodiment, storing at least one pattern consists in storing the prediction index in a table indexed by the possible indexes of the left neighbour.

In an embodiment, a prediction index in said table is initialized with an initialization value which is the index having occurred most frequently for a given index of the left neighbour.

In an embodiment, a prediction index in said table is initialized with an initialization value comprising a predetermined value.

In an embodiment, the method further comprising storing the prediction index in a table indexed by pattern, wherein a prediction index in said table is initialized with an initialization value which is the index having occurred most frequently for a given index of the left neighbour.

In an embodiment, said table is initialized with a same initialization value for each prediction index or with a same initialization value for each prediction index except one.

In an embodiment, said initialization value is the index "0" except for a pattern having a left neighbour index equal to "0" in which case the initialization value is the index "1".

In an embodiment, the possible indexes of the left neighbour in the table do not include an index value reserved for an escape flag used for signalling in the palette that a pixel value of a coding unit is not encoded using a pixel value from said palette.

In an embodiment, said table is initialized for each coding unit.

In an embodiment, said table is initialized for each coding unit except when the palette used for encoding a current coding unit is the same as the palette used for encoding the previous coding unit.

In an embodiment, the method further comprises:
updating said prediction index associated with the stored pattern with the current index.

In an embodiment, said pattern being constituted by the left neighbour of the current index, the updating step is omitted if the index of said left neighbour is equal to the current index.

In an embodiment, said updating step is done only when the index to be encoded does not correspond to said prediction index associated to the stored pattern a predefined number of times, said index to be encoded being the same each time.

In an embodiment, the number of stored patterns is a number of possible patterns according to the pattern configuration.

In an embodiment, the number of stored patterns is strictly inferior to a number of possible patterns according to the pattern configuration.

In an embodiment, said patterns are associated to a plurality of prediction indexes.

In an embodiment, said stored patterns correspond to the last and the penultimate indexes encountered corresponding to said pattern.

In an embodiment, encoding the current index by reference to said corresponding stored pattern comprises:
encoding information signaling that the index is to be retrieved using a stored pattern.

In an embodiment, encoding the current index to be encoded by reference to said stored patterns comprises:
encoding information signalling the associated prediction index to be used.

According to an aspect of the invention there is provided a method for encoding a block of indexes used for encoding a coding unit of an image according to a palette, each index being related to one of the pixels forming the coding unit, the palette comprising a set of indexes associated to pixel values, wherein the method comprises according to a specific pattern mode:

storing at least one pattern constituted by the indexes of at least one neighbour of an index of the block of indexes, said pattern being associated with at least one prediction position value corresponding to the position in the image of an index expected at a location in the neighbourhood of the pattern;

identifying for a current index to be encoded in the block of indexes a stored pattern corresponding to the neighbourhood of the current index; and if the index to be encoded corresponds to the index memorized at the prediction position associated to the stored pattern then encoding the index of the current index by reference to the stored pattern.

In an embodiment, the method further comprises:
encoding a repetition value indicating a number of indexes, following the index to encode, which are to be retrieved using the number of indexes following the index indicated by said prediction position.

In an embodiment, the allowed prediction position is limited by a threshold.

In an embodiment, the method further comprises:
updating said prediction position associated with the stored pattern with the position of the current index.

In an embodiment, said pattern being constituted by the left neighbour of the current index, the updating step is omitted if the index of said left neighbour is equal to the current index.

In an embodiment, said updating step is done only when the index to be encoded does not correspond to said the index at the prediction position associated to the stored pattern a predefined number of times, said index to be encoded being the same each time.

In an embodiment, said patterns are constituted by the index of the left neighbour of the current index.

In an embodiment, the number of stored patterns is a number of possible patterns according to the pattern configuration.

In an embodiment, the number of stored patterns is strictly inferior to a number of possible patterns according to the pattern configuration.

In an embodiment, said patterns are associated to a plurality of prediction positions.

In an embodiment, said stored patterns correspond to the position of the last and the penultimate indexes encountered corresponding to said pattern.

In an embodiment, encoding the current index by reference to said corresponding stored pattern comprises:

encoding information signaling that the index is to be retrieved using a stored pattern.

In an embodiment, encoding the current index to be encoded by reference to said stored patterns comprises:

encoding information signalling the associated prediction position to be used.

In an embodiment, the method further comprises selecting a coding mode among a set of pre-defined coding modes including the pattern mode, and encoding an information for signalling the selected coding mode.

In an embodiment, if the prediction position value associated to the identified stored pattern is not comprised in a predefined range, the current index is encoded by reference to a default prediction position value and the pattern associated to this default prediction position value.

In an embodiment, the default prediction position value is fixed.

In an embodiment, the default prediction position value is based on the prediction position value associated to the identified stored pattern.

According to an aspect of the invention there is provided a method for decoding a block of indexes used for decoding a coding unit of an image according to a palette, each index being related to one of the pixels forming the coding unit, the palette comprising a set of indexes associated to pixel values, wherein the method comprises:

storing at least one pattern constituted by the indexes of at least one neighbour of an index of the block of indexes, said pattern being associated with at least one prediction index corresponding to an index expected at a location in the neighbourhood of the pattern;

identifying for a current index to be decoded in the block of indexes a stored pattern corresponding to the neighbourhood of the current index; and decoding the index of the current index by reference to the stored pattern.

In an embodiment, said patterns are constituted by the index of the left neighbour of the current index.

In an embodiment, storing at least one pattern consists in storing the prediction index in a table indexed by the possible indexes of the left neighbour.

In an embodiment, a prediction index in said table is initialized with an initialization value which is the index having occurred most frequently for a given index of the left neighbour.

In an embodiment, a prediction index in said table is initialized with an initialization value comprising a predetermined value.

In an embodiment, the method further comprising storing the prediction index in a table indexed by pattern, wherein a prediction index in said table is initialized with an initialization value which is the index having occurred most frequently for a given index of the left neighbour.

In an embodiment, said table is initialized with a same initialization value for each prediction index or with a same initialization value for each prediction index except one.

In an embodiment, said initialization value is the index "0" except for a pattern having a left neighbour index equal to "0" in which case the initialization value is the index "1".

In an embodiment, the possible indexes of the left neighbour in the table do not include an index value reserved for an escape flag used for signalling in the palette that a pixel value of a coding unit is not encoded using a pixel value from said palette.

In an embodiment, said table is initialized for each coding unit.

In an embodiment, said table is initialized for each coding unit except when the palette used for encoding a current coding unit is the same as the palette used for encoding the previous coding unit.

In an embodiment, the method further comprises:

updating said prediction index associated with the stored pattern with the current index.

In an embodiment, said pattern being constituted by the left neighbour of the current index, the updating step is omitted if the index of said left neighbour is equal to the current index.

In an embodiment, said updating step is done only when the index to be decoded does not correspond to said prediction index associated to the stored pattern a predefined number of times, said index to be decoded being the same each time.

In an embodiment, the number of stored patterns is a number of possible patterns according to the pattern configuration.

In an embodiment, the number of stored patterns is strictly inferior to a number of possible patterns according to the pattern configuration.

In an embodiment, said patterns are associated to a plurality of prediction indexes.

In an embodiment, said stored patterns correspond to the last and the penultimate indexes encountered corresponding to said pattern.

In an embodiment, decoding the current index by reference to said corresponding stored pattern comprises:

decoding information signalling that the index is to be retrieved using a stored pattern.

In an embodiment, decoding the current index to be decoded by reference to said stored patterns comprises:

decoding information signalling the associated prediction index to be used.

According to an aspect of the invention there is provided a method for decoding a block of indexes used for decoding a coding unit of an image according to a palette, each index being related to one of the pixels forming the coding unit, the palette comprising a set of indexes associated to pixel values, wherein the method comprises according to a specific pattern mode:

storing at least one pattern constituted by the indexes of at least one neighbour of an index of the block of indexes, said pattern being associated with at least one prediction position value corresponding to the position in the image of an index expected at a location in the neighbourhood of the pattern;

identifying for a current index to be decoded in the block of indexes a stored pattern corresponding to the neighbourhood of the current index; and decoding the index of the current index by reference to the stored pattern.

In an embodiment, the method further comprises:

decoding a repetition value indicating a number of indexes, following the index to decode, which are to be retrieved using the number of indexes following the index indicated by said prediction position.

In an embodiment, the allowed prediction position is limited by a threshold.

In an embodiment, the method further comprises:

updating said prediction position associated with the stored pattern with the position of the current index.

In an embodiment, said pattern being constituted by the left neighbour of the current index, the updating step is omitted if the index of said left neighbour is equal to the current index.

In an embodiment, said updating step is done only when the index to be decoded does not correspond to said the index at the prediction position associated to the stored pattern a predefined number of times, said index to be decoded being the same each time.

In an embodiment, said patterns are constituted by the index of the left neighbour of the current index.

In an embodiment, the number of stored patterns is a number of possible patterns according to the pattern configuration.

In an embodiment, the number of stored patterns is strictly inferior to a number of possible patterns according to the pattern configuration.

In an embodiment, said patterns are associated to a plurality of prediction positions.

In an embodiment, said stored patterns correspond to the position of the last and the penultimate indexes encountered corresponding to said pattern.

In an embodiment, decoding the current index by reference to said corresponding stored pattern comprises:

decoding information signalling that the index is to be retrieved using a stored pattern.

In an embodiment, decoding the current index to be decoded by reference to said stored patterns comprises:

decoding information signalling the associated prediction position to be used.

In an embodiment, the method further comprises selecting a coding mode among a set of pre-defined coding modes including the pattern mode, and decoding an information for signalling the selected coding mode.

In an embodiment, if the prediction position value associated to the identified stored pattern is not comprised in a predefined range, the current index is decoded by reference to a default prediction position value and the pattern associated to this default prediction position value.

In an embodiment, the default prediction position value is fixed.

In an embodiment, the default prediction position value is based on the prediction position value associated to the identified stored pattern.

According to an aspect of the invention there is provided an encoding device adapted to implement a method according to the invention.

According to an aspect of the invention there is provided a decoding device adapted to implement a method according to the invention.

According to an aspect of the invention there is provided a computer program product for a programmable apparatus, the computer program product comprising a sequence of instructions for implementing a method according to the invention, when loaded into and executed by the programmable apparatus.

According to an aspect of the invention there is provided a non-transitory computer-readable storage medium storing instructions of a computer program for implementing a method according to the invention.

According to an aspect of the invention there is provided a information storage means readable by a computer or a microprocessor storing instructions of a computer program, wherein it makes it possible to implement the method mentioned above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 9 illustrates the same block of levels and the set of syntax elements used for the encoding of this block of levels;

FIGS. 16 *a* & *b* illustrate an embodiment related to the invention;

FIGS. 17 *a* & *b* illustrate pattern tables used in an embodiment where the position of the pattern is used;

DETAILED DESCRIPTION OF THE INVENTION

Figure 1:
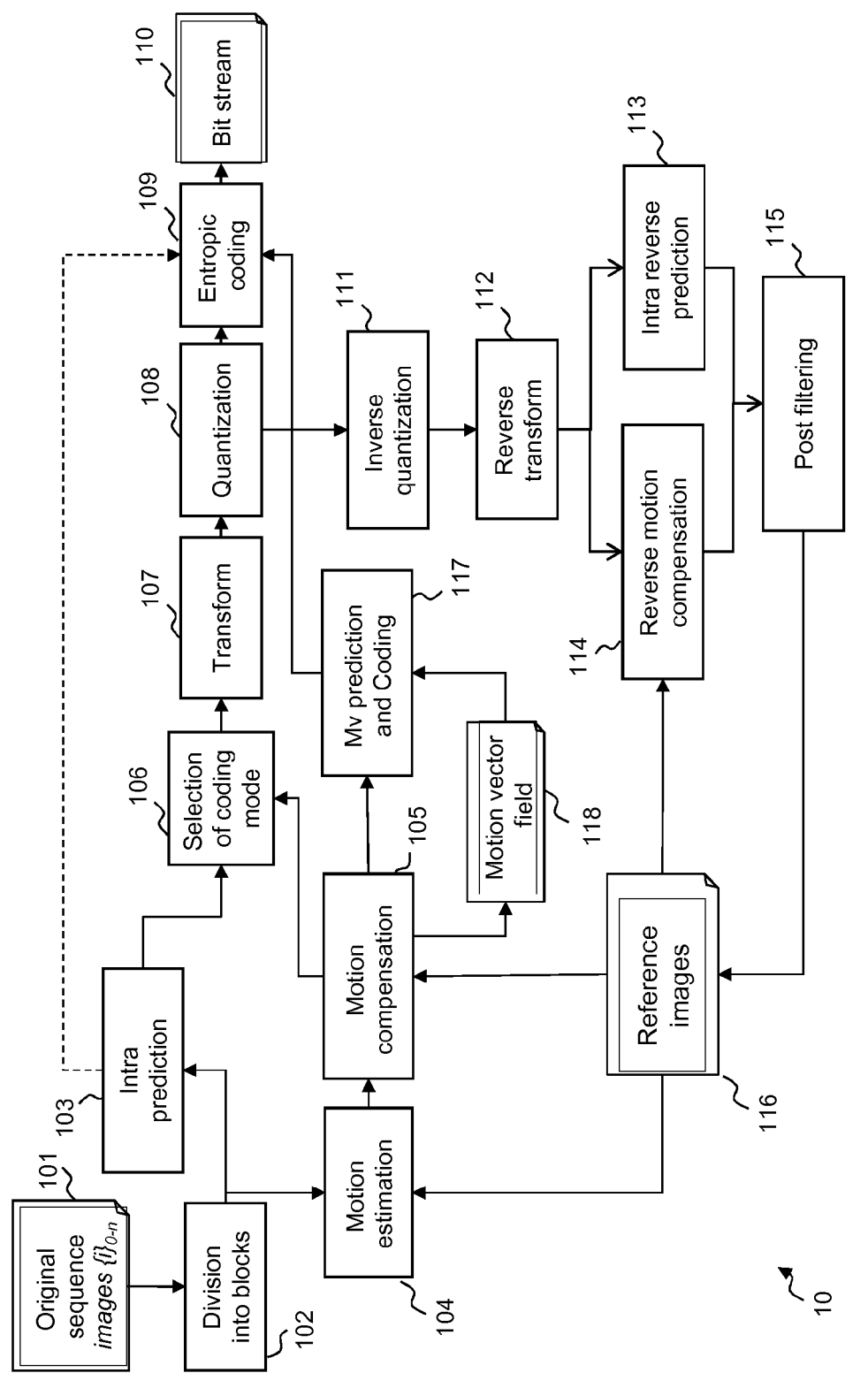
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction or INTRA modes 103 and the modes based on temporal prediction or INTER modes based on motion estimation 104 and motion compensation 105. An INTRA Coding Unit is generally predicted from the encoded pixels at its causal boundary by a process called INTRA prediction. An extension of HEVC being currently designed, known as HEVC RExt, adds an additional coding mode, namely the Palette coding mode that competes with INTRA and INTER coding modes to encode blocks of pixels. This Palette coding mode is described with more details below, in particular with reference to FIGS. 7 to 13.

Temporal prediction of INTER coding mode first consists in finding in a previous or future frame called the reference frame 116 the reference area which is the closest to the Coding Unit in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between 3 blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Then, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the decoding loop. It means that they need to be applied on the reconstructed frame at the encoder and decoder in order to use the same reference frames at the encoder and decoder. The aim of this post filtering is to remove compression artifacts.

Figure 2:
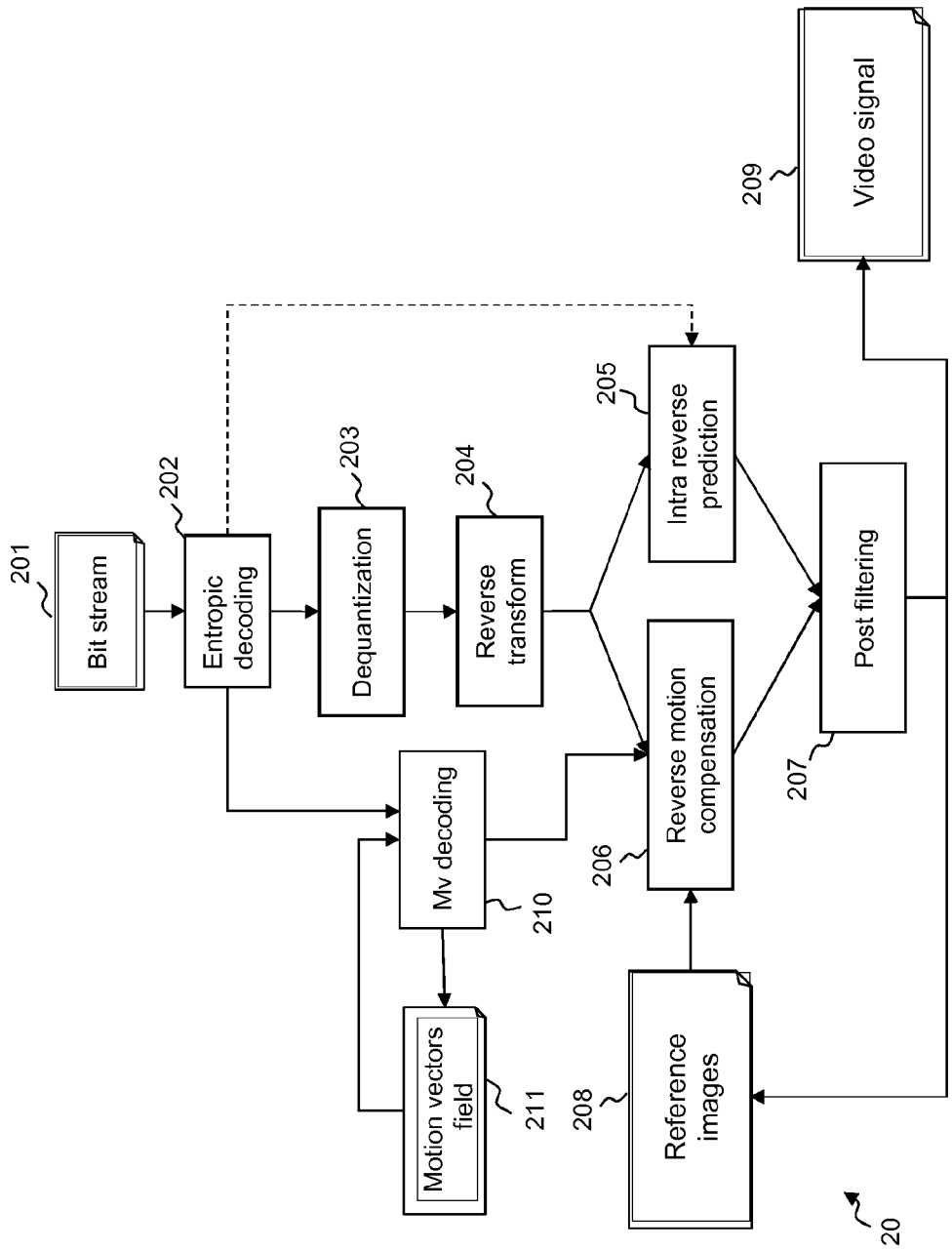
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The mode data are also entropy decoded and in function of the mode, t INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

Figure 3:
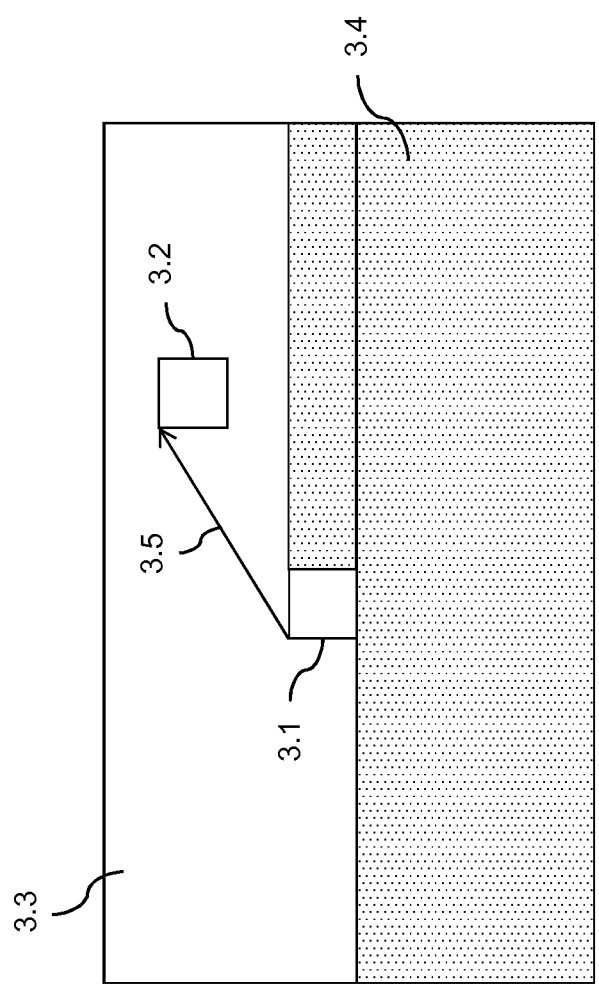
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as doted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Range Extension draft specifications, a displacement vector 3.5, which can be transmitted in the bitstream, may indicate this block 3.2.

Figure 5:
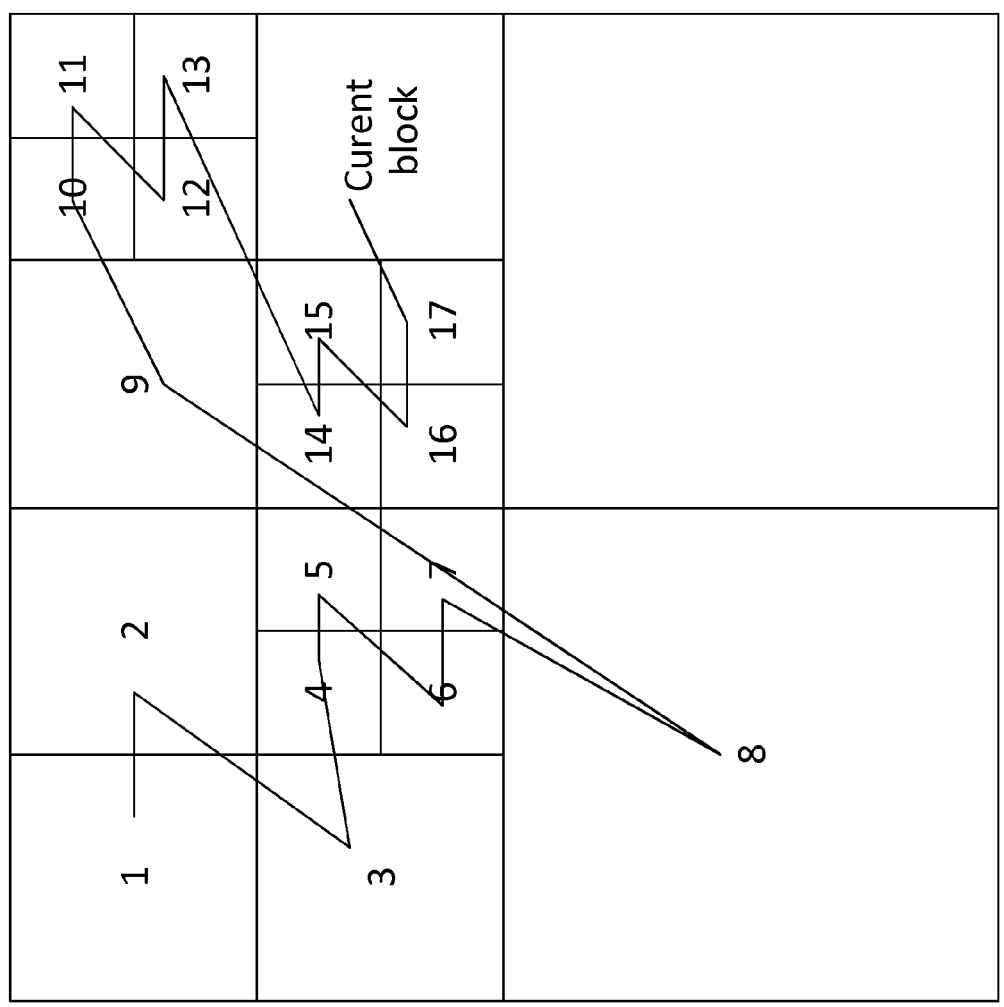
FIG. 5 illustrates the Coding Tree Block splitting in Coding Units and the scan order decoding of these Coding Units.

FIG. 5 illustrates a splitting of a Coding Tree Block into Coding Units and an exemplary scan order to sequentially process of these Coding Units. In the HEVC standard, the block structure is organized by Coding Tree Blocks (CTBs). A frame contains several non-overlapped and square Coding Tree Block. The size of a Coding Tree Block can be equal to 64×64 to 16×16. This size is determined at sequence level. The most efficient size, in term of coding efficiency, is the largest one: 64×64. Please note that all Coding Tree Blocks have the same size except for the image border. The size of the boundary CTBs is adapted according to the amount of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding like the Context based Adaptive Binary Arithmetic Coding (CABAC), Golomb-rice Code, or simple binary representation called Fixed Length Coding. Most of the time, a binary encoding process is performed to represent the different syntax element. This binary encoding process is also very specific and depends on the different syntax elements.

For example, the syntax element called "coeff_abs_level_remaining" contains the absolute value or a part of an absolute of the coefficient residual. The idea of this binary encoding process is to use Golomb-Rice code for the first values and Exponential Golomb for the higher values. More specifically, depending on a given parameter called Golomb Order, this means that for representing the first values, for example values from 0 to 3, a Golomb-Rice code is used, then for higher values, for example values from 4 and above, an Exponential Golomb code is used. The Golomb Order is a parameter used by both the Golomb-Rice code and the exponential Golomb code.

Figure 6:
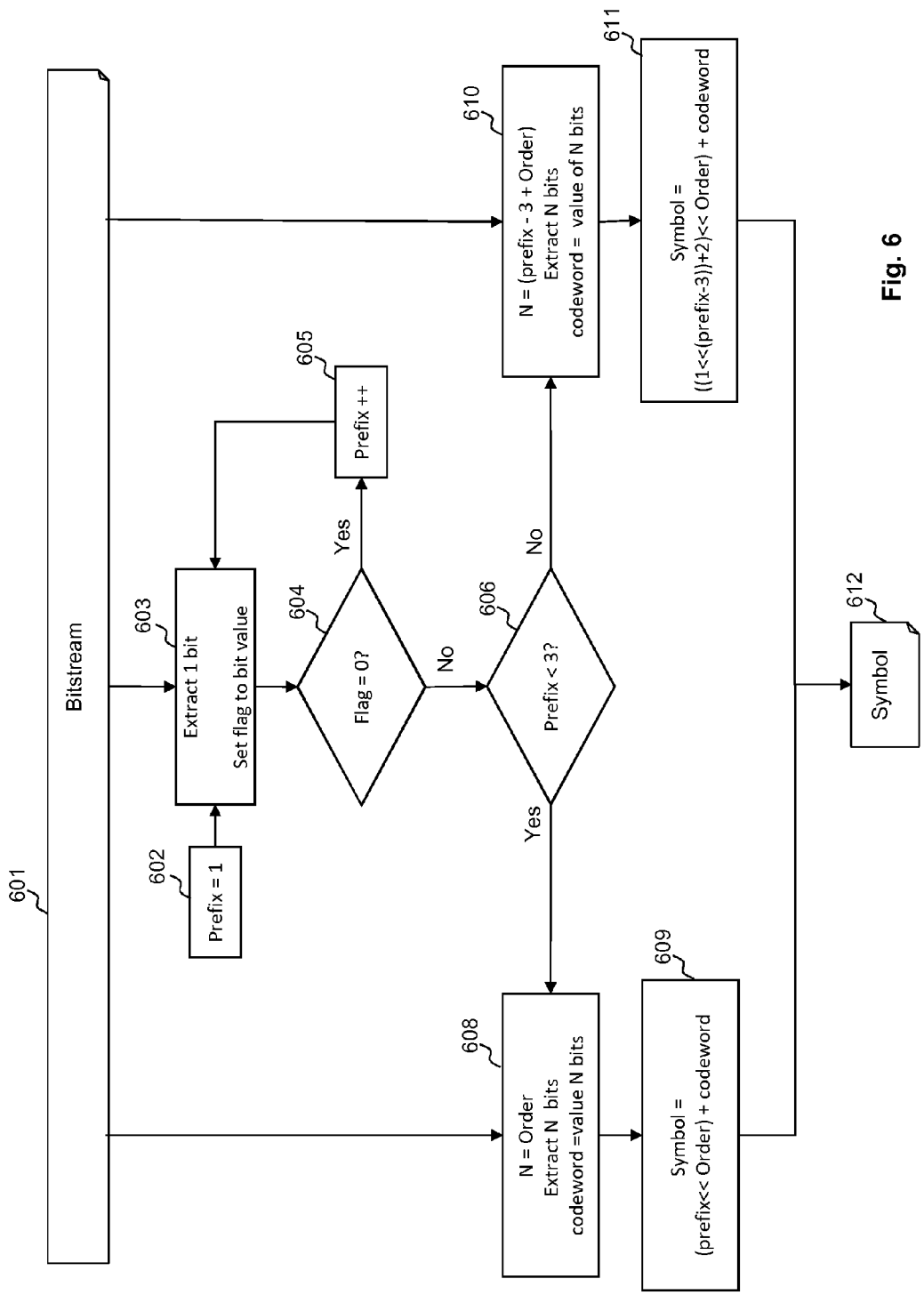
FIG. 6 illustrates the Golomb based binary coding of a syntax element in HEVC.

FIG. 6 illustrates this principle at the decoding side. The input data of the decoding process are the bistream 601 and the Order which is known as the Rice Golomb parameter, or the Golomb Order. The output of this process is the decoded symbol 612.

The prefix value is set equal to 1 at step 602 then 1 bit is extracted from the bitstream at step 601 and the variable flag is set equal to the decoded value 603. If this flag is equal to 0 at step 604 the Prefix value is incremented 605 and another bit is extracted from the bitstream 603. When the flag value is equal to 1, the decision module 606 checks if the value Prefix is strictly inferior to 3. If it is true, the N=Order bits are extracted 608 from the bitstream 601 and set to the variable "codeword". This corresponds to the Golomb-Rice representation. The Symbol value 612 is set equal to ((prefix<<Order)+codeword) as depicted in step 609. Where '<<' is the left shift operator.

If the Prefix is superior or equal to 3 at step 606, the next step is 610 where N=(prefix−3+Order) bits are extracted from the bitstream and set to the variable "codeword" 610. The symbol value 611 is set equal to ((1<<(prefix−3))+2) <<Order)+codeword. This corresponds to the exponential Golomb representation.

In the following, this decoding process, and in a symmetric way the corresponding encoding process, is called Golomb_H with an input parameter corresponding to the Golomb Order. It can be noted in a simple way Golomb_H (Order).

In HEVC, for some syntax elements such as residuals, the Golomb Order is updated in order to adapt the entropy coding to the signal to be encoded. The updating formula tries to reduce the Golomb code size by increasing the Golomb Order when the coefficients have large values. In the HEVC standard, the update is given by the following formula:

$$\text{Order}=\text{Min}(c\text{LastRiceOrder}+(c\text{LastAbsLevel}>(3*(1<<c\text{LastRiceOrder}))?1:0),4)$$

Where cLastRiceOrder is the last used Order, cLastAbsLevel is the last decoded coeff_abs_level_remaining. Please note that for the first parameter to be encoded or decoded, cLastRiceOrder and cLastAbsLevel are set equal to 0. Moreover please note that the parameter Order cannot exceed the value of 4 in this formula. And where the expression (C?A:B) has the value A if the condition C is true and B if the condition C is false.

The HEVC Range Extension, also commonly called HEVC RExt, is an extension that is currently being drafted of the new video coding standard HEVC.

Figure 4:
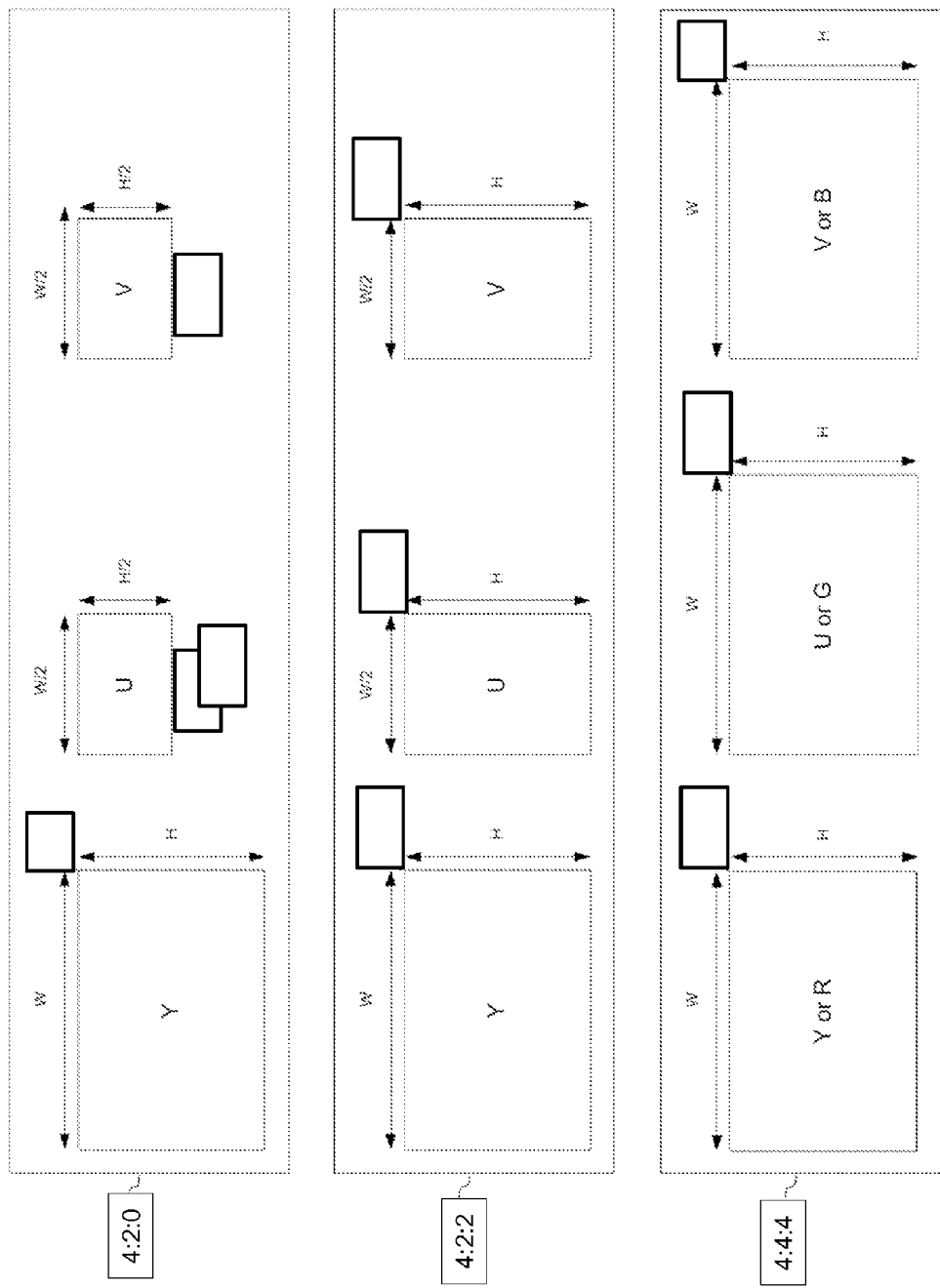
FIG. 4 illustrates different video formats.

An aim of this extension is to provide additional tools to code video sequences with additional colour formats and bit-depth, and possibly losslessly. In particular, this extension is designed to support 4:2:2 colour format as well as 4:4:4 video format in addition to 4:2:0 video format (see FIG. 4). A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

Regarding the bit-depth which is the number of bits used to code each colour component of a pixel, if the current HEVC standard is able to deal with 4:2:0 colour format with 8 and 10 bits bit-depth (i.e. 256 to 1,024 possible colours), HEVC RExt is about to be designed to additionally support 4:2:2 and 4:4:4 video format with an extended bit-depth ranging from 8 bits up to 16 bits (i.e. up to 65,536 possible colours). This is particularly useful to have a larger dynamic of colour components.

HEVC RExt is also designed to provide a lossless encoding of the input sequences; this is to have a decoded output 209 strictly identical to the input 101. To achieve this, a number of tools have been modified or added, compared to the conventional HEVC lossy codec. A non-exhaustive list of exemplary modifications or additions to operate losslessly is provided here below:

removal of the quantization step 108 (203 at the decoder);

forced activation of the bypass transform, as normal cosine/sine transforms 107 may introduce errors (204 at the decoder);

removal of tools specifically tailored at compensating quantization noise, such as post filtering 115 (207 at the decoder).

For HEVC RExt, the updating formula of the Golomb Order has been further modified in order to be adapted to deal with higher bit-depth and to take into account very high quality required by application dealing with video compression of extended format (4:2:2 and 4:4:4) including lossless coding. For HEVC RExt, the updating formula has been changed as follows:

Order=Min($c$LastRiceOrder+($c$LastAbsLevel>>(2+$c$LastRiceOrder)),7)

With this formula, the maximum value of Order is 7. Moreover, for the first coding of the coeff_abs_level_remaining for a sub-block of Transform block, the Golomb order is set equal to:

Order=Max(0,$c$RiceOrder−(transform_skip_flag∥cu_transquant_bypass_flag?1:2))

where the variable "transform_skip_flag" is set to 1 if the transform (e.g. DCT 107 or 204) is skipped for the current coding unit and 0 if the transform is used, the variable "cu_transquant_bypass_flag" is set to 1 if the coding unit is lossless encoded and 0 otherwise, the variable "cRiceOrder" is set equal to last used Order from another sub-block of the transform block otherwise is set to 0.

Additional tools for HEVC RExt are currently being designed to efficiently encode "screen content" video sequences in addition to natural sequences. The "screen content" video sequences refer to particular video sequences which have a very specific content corresponding to those captured from a personal computer of any other device containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The current tools currently discussed on in HEVC RExt to process "screen content" video sequences include the Intra Block Copy mode and the Palette mode. Prototypes for these modes have shown good coding efficiency compared to the conventional method targeting natural video sequences. Focus is made in this document on the Palette coding mode.

The palette mode of HEVC RExt is a prediction mode. It means that the Palette method is used to build a predictor for the coding of a given coding unit similarly to a prediction performed by motion prediction (Inter case) or by an Intra prediction. After the generation of the prediction, a residual coding unit is transformed, quantized and coded. In other words, the same processes as described above with reference to FIGS. 1 and 2 apply.

Figure 8:
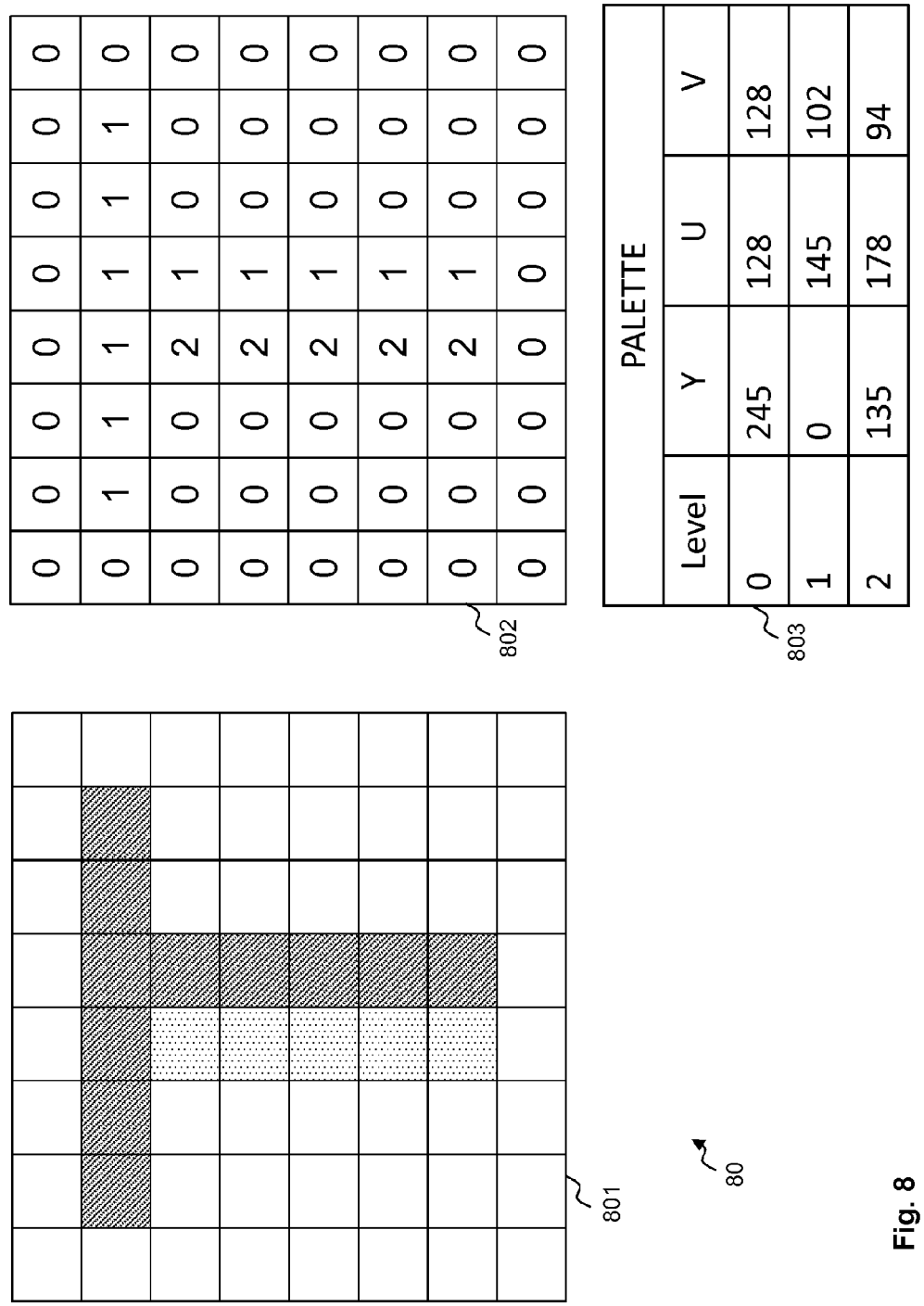
FIG. 8 illustrates an example of coding unit with its corresponding block of levels and the associated palette.

A palette is generally represented by a table containing a finite set of N-tuple of colors, each color being defined by its components in a given colour space (see for example 803 in FIG. 8 based on YUV colour space). For example, in a typical RGB format, the palette is composed of a list of P elements of N-tuple (where N=3 for a RGB). More precisely, each element corresponds to a fixed triplet of colour components in the RGB format. Of course, this is not limited to a RGB or YUV colour format. Any other colour format can be represented by a palette and can use a smaller or a higher number of colour components, meaning that N may be different from 3.

At the encoder side, the Palette mode, under consideration in RExt, consists in transforming pixel values of a given input coding unit into indexes called levels identifying the entries in an associated palette. After the transformation, the resulting coding unit or block is composed of levels and is then transmitted to the decoder with the associated palette, generally a table having a finite number of triplets of colours used to represent the coding unit. Since the palette defines a finite number of colours, the transformation into a block of indexes usually approximates the original input coding unit.

To apply the Palette mode at the encoder side, an exemplary way to transform a coding unit of pixels is performed as follows:

find the P triplets describing at best the coding unit of pixels to encode, for example by minimizing overall distortion;

then associate with each pixel of the coding unit the closest colour among the P triplets: the value to encode (or level) is then the index corresponding to the entry of the associated closest colour.

For each coding unit, the palette (i.e. the P triplets found), the block of indexes or levels and the residual representing the difference between the original coding unit and the block of indexes in the colour space (which is the block predictor) are coded in the bitstream 110 and sent to the decoder.

At the decoder, the Palette mode consists in operating the conversion in the reverse way. This means that each decoded index associated with each pixel of the coding unit is replaced by the corresponding colour in the palette decoded from the bitstream, in order to reconstruct the corresponding colour for each pixel of the coding unit. This is the reconstruction of the block of indexes in the colour space (i.e. of the coding unit predictor). Since the Palette mode is a prediction mode, the associated residual is decoded from the bitstream and then added to the reconstructed coding unit predictor to build the final reconstructed coding unit.

Figure 7:
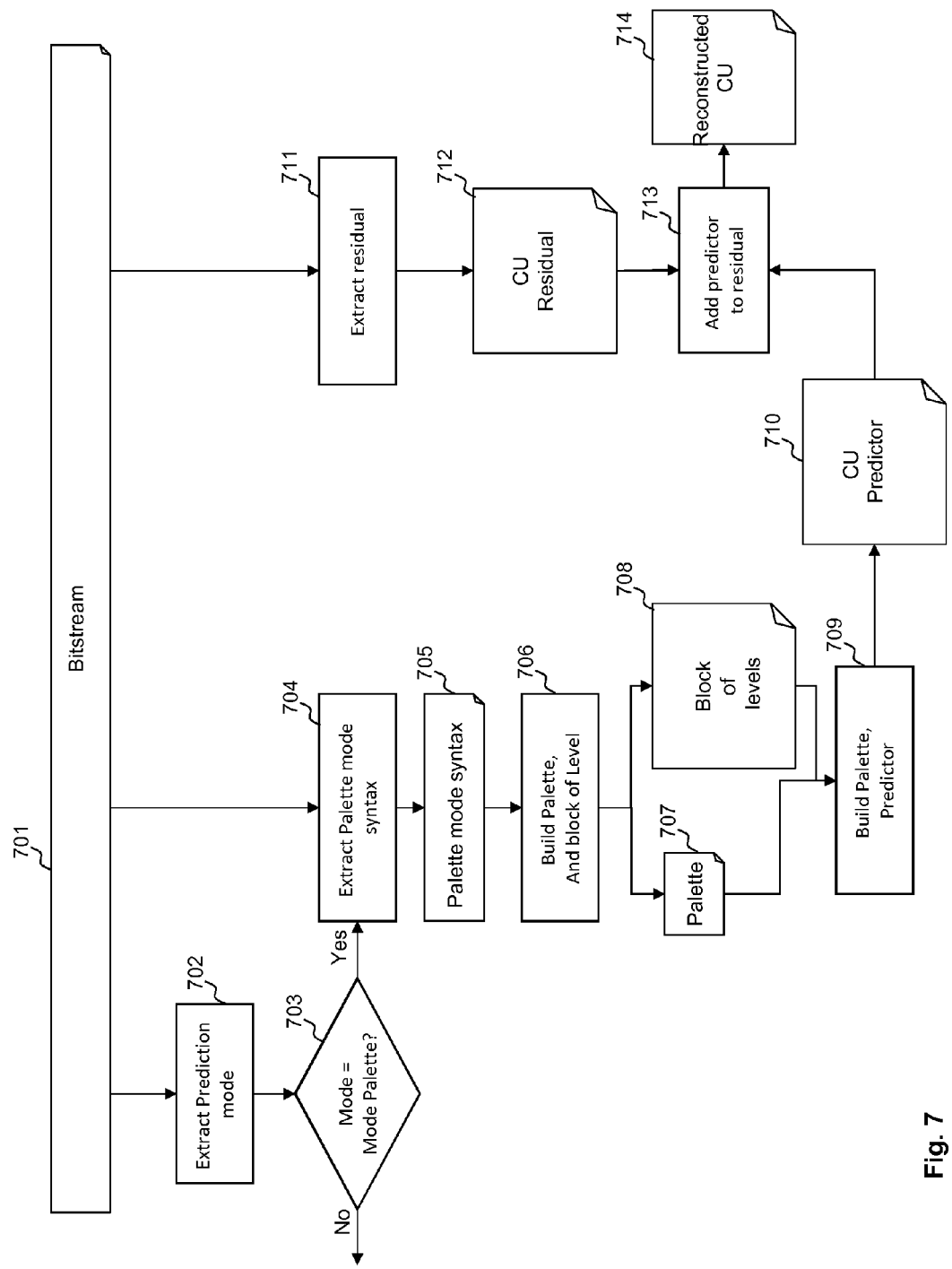
FIG. 7 illustrates the principle of Palette mode prediction at the decoder side under investigation in the Range Extension of HEVC.

FIG. 7 further illustrates the principle of Palette mode at the decoder. The prediction mode for the current coding unit is extracted at step 702 from the bitstream 701. Currently, the Palette mode is identified by a flag located before the skip flag in the bitstream (the other coding modes have been described above with reference to FIGS. 1 and 2). This flag is CABAC coded using a single context. If this mode is the Palette mode 703 then the related syntax of the Palette mode 705, i.e. the information on the palette, the block of levels and the residual, is extracted and decoded 704 from the bitstream 701.

Then, during step 706, two elements are built from the decoded data: the palette 707 and the block of levels 708. From this block of levels and the associated palette, the coding unit predictor in pixel domain 710 is built 709. It means that for each level of the block of levels, a color (RGB or YUV) is associated to each pixel.

Then the coding unit residual is decoded 711 from the bitstream 701. In the current implementation Palette mode, the residual associated with a Palette mode is coded using the common HEVC Inter residual coding method, i.e. using Golomb coding. To obtain the residual of the coding unit, the conventional inverse quantization and inverse transformation are performed. The block predictor 710 is added 713 to this coding unit residual 712 in order to form the reconstructed coding unit 714.

FIG. 8 illustrates the principle of the Palette mode at the encoder. The current coding unit 801 is converted into a block 802 of the same size which contains a level for each pixel instead of 3 colour values (Y, U, V) or (R, G, B). The palette 803 associated with this block of levels is built based on coding unit overall distortion minimization and associates at each entry, an entry index or level with corresponding pixel colour values. Please note that for monochrome application, the pixel value can contain only one component.

As mentioned in relation to FIG. 7, the palette (as well as the residual) is coded and inserted in the bitstream for each coding unit. In the same way, the block of levels (corresponding to the coding unit predictor) is coded and inserted in the bitstream and an example of the coding is given below with reference to FIG. 9. In this example, the block of levels is scanned in a horizontal order.

The block of levels 91 is exactly the same as the one illustrated in FIG. 8 under reference 802. The tables 92 and 93 describe the successive syntax elements used to code the block of levels 91. Table 93 should be read as the continuation of table 92. The syntax elements in the table correspond to the encoding of the groups of levels surrounded by bold lines in the block 91.

The block of levels is encoded by group of successive pixels in scan order. Each group is encoded using a first syntax element giving a prediction direction, a second element giving the repetition, and an optional third element giving the value of the pixel, namely the level. The repetition corresponds to the number of pixels in the group.

These two tables depict the current syntax associated to the Palette mode. These syntax elements correspond to the encoded information associated in the bitstream for the block of levels 91. In these tables, three main syntax elements are used to fully represent the operations of the Palette mode and are used as follows when successively considering the levels of the block of levels 91.

A first syntax element, called "Pred mode" allows to distinguish between two encoding modes. In a first mode corresponding to "Pred mode" flag equal to "0", a new level is used for the current pixel. The level is immediately signalled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 91.

A second syntax element called "Level" indicates the level value of the palette for the current pixel only in the first mode of "Pred mode".

A third syntax element, called "Run", is used to encode a repetition value in both modes of "Pred mode". Considering that the block of levels 91 is scanned from the top left corner to the bottom right corner, row by row from left to right and top to bottom, the Run syntax element gives the number of successive pixels in block 91 having the same encoding.

This "Run" syntax element has a different meaning which depends on the "pred mode" flag. When Pred mode is 0, "Run" element is the number of successive pixels of the predictor block having the same level value. For example, if Run=8 this means that the current "Level" is applied to the current pixel and to the following 8 pixels which corresponds to 9 identical successive samples in raster scan order.

When Pred mode is 1, "Run" element is the number of successive pixels of the predictor block having a level value corresponding to the level value of their above pixel in block 91, i.e. where the "copy up" mode is applied. For example, if Run=31 this means that the level of the current pixel is copied from the pixel of the line above as well as the following 31 pixels which corresponds to 32 pixels in total.

Regarding tables 92 and 93, represent the eight steps to represent the block 91 by using the Palette mode. Each step starts with the coding of the "Pred mode" flag which is followed by the "Level" syntax element when "Pred mode" flag equals "0," or by the "Run" syntax element when "Pred mode" flag equals "1". The "Level" syntax element is always followed by a "Run" syntax element.

When the prediction mode decoded for the current block is the palette mode, the decoder first decodes the syntax related to this block and then applied the reconstruction process for the coding unit.

Figure 10:
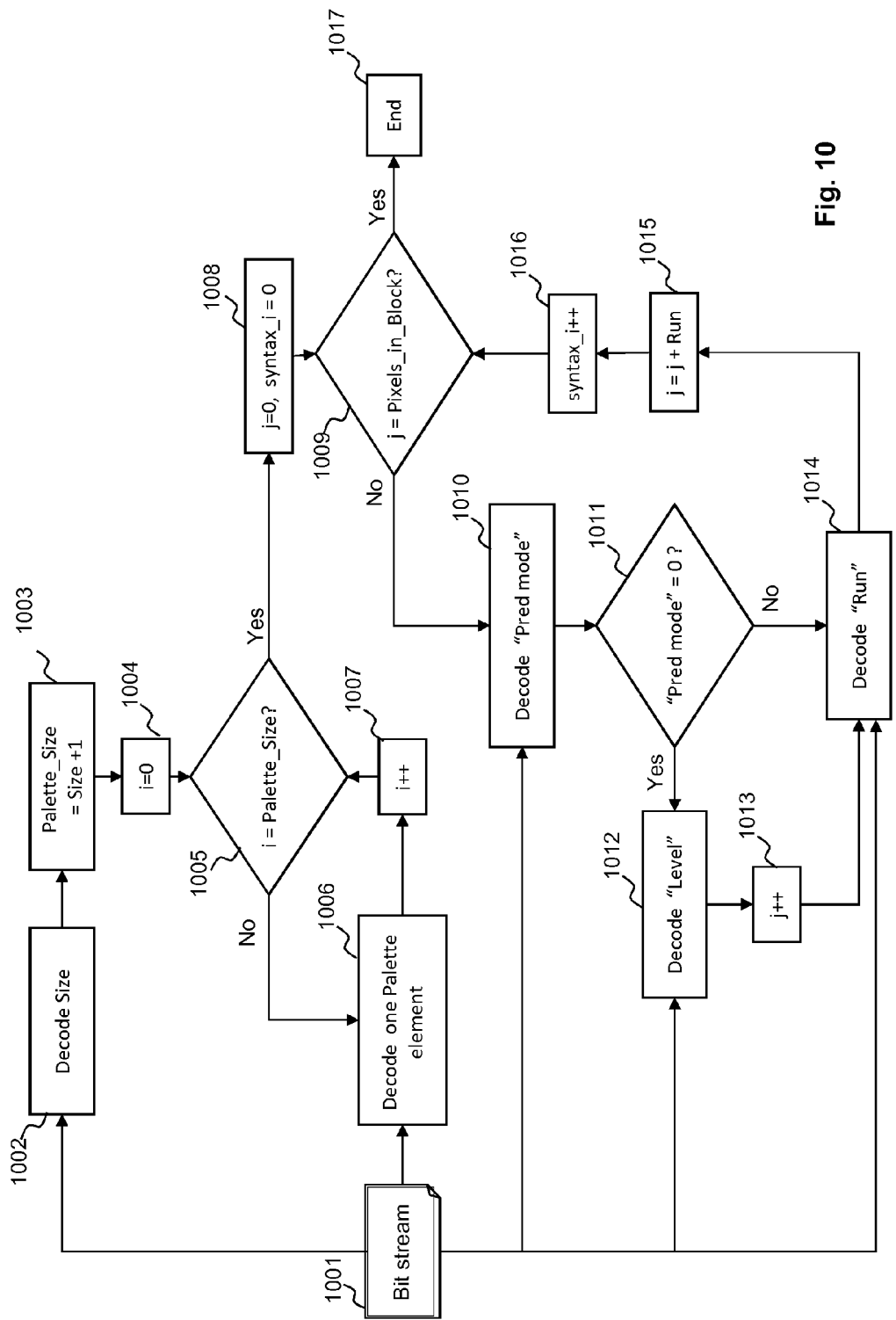
FIG. 10 illustrates the decoding process of the syntax elements related to the Palette mode.

FIG. 10 illustrates the decoding process of the syntax elements related to the Palette mode. First, the size of the palette is extracted and decoded 1002 from the bitstream 1001. The exact size of the palette (Palette_size) is obtained by adding 1 to this size value decoded at step 1002. Indeed, the size is coded by using a unary code for which the value 0 has the smallest number of bits (1 bit) and the size of the palette cannot be equal to 0, otherwise no pixel value can be used to build the block predictor.

Then the process corresponding to the palette values decoding starts. A variable "i" corresponding to the index of the palette is set equal to 0 at step 1004 next a test is performed at step 1005 to check if "i" is equal to the palette size (Palette_size). If it is not the case, one palette element is extracted from the bitstream 1001 and decoded 1006 and is then added to the palette with the associated level/index equal to "i". Then the variable "i" is incremented through step 1007. If "i" is equal to the palette size 1005, the palette has been completely decoded.

Next the process corresponding to the decoding of the block of levels 91 is performed. First, the variable j, corresponding to a pixel counter, is set to 0 as well as the variable syntax_i 1008. Then a check is performed to know if the pixel counter corresponds to the number of pixels contained in the block. If the answer is yes at step 1009 the process ends at step 1017, otherwise the value of the flag "Pred mode" corresponding to one prediction mode is extracted from the bitstream 1001 and decoded 1010.

The value of "Pred mode" is added to a table at the index syntax_i containing all "Pred mode" value decoded. If the value of this "Pred mode" is equal to 0, step 1011, the syntax element corresponding to "Level" is extracted from the bitstream 1001 and decoded 1012. This variable "Level" is added to a table at the index syntax_i containing all levels decoded. The variable j corresponding to the pixel counter is incremented by one 1013.

Next the "Run" syntax element is decoded at step 1014. If the syntax element "Pred Mode" is equal to 1, step 1011, the "Run" value is also decoded at step 1014. This syntax element "Run" is added to a table at the index syntax_i containing all the runs decoded.

Next at step 1015, the value j is incremented by the value of the run decoded at step 1014. The variable syntax_i is incremented by one to consider the next set of syntax elements. If the counter j is equal to the number of pixels in the block then the syntax to build the block of levels 91 is finished 1017. At the end of this process related to the Palette, the decoder knows the palette, and the tables containing the list of all the "Pred mode", "Level" and "Run" syntax elements associated with the Palette mode of this coding unit. The decoder can then proceed with the reconstruction process of the coding unit as described through FIG. 7.

Each palette element, constituted by three values in the above examples, is generally encoded using three binary codes. The length of the binary codes corresponds to the bit-depth of each color component. The palette size is typically encoded using unary code. The "Pred mode" element is encoded using one bit. The "Level" element is encoded using binary code with binary code length equal to b, where $2^b$ is the smallest integer equal or above the palette size. And the "Run" element is encoded using Golomb_H (Order=3) as explained above in relation to FIG. 6.

Figure 11:
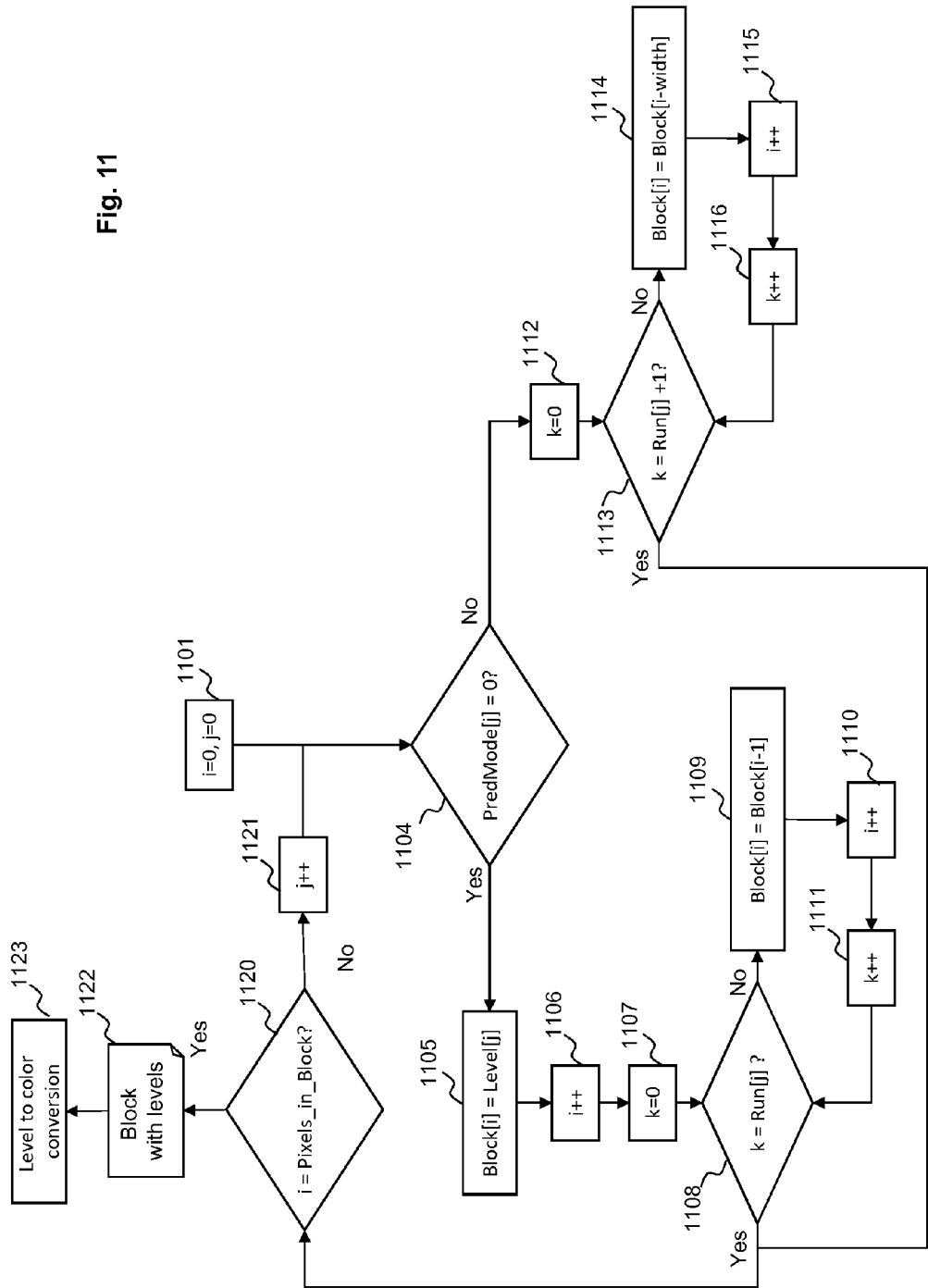
FIG. 11 illustrates the reconstruction process to build the block of levels and then the block predictor in the colour space that has to be used as predictor.

FIG. 11 illustrates the reconstruction process to build the block of levels 91 and then the block predictor in the colour space that has to be used as predictor. The input data of this process are the tables obtained in the process of FIG. 10 above, and containing the list of "Pred mode", "Level" and "Run". An additional input data is the size of the coding unit 801 (which is the same as the size of the block of levels 802/91) known from the quadtree (FIG. 5) signalled in the bitstream.

In a first step 1101, a variable "i", representing a pixel counter, is set equal to 0 and a variable "j", to successively consider each set of syntax elements, is also set equal to 0. At step 1104, the element Pred_mode[j] extracted from the table of "Pred mode" at index j is checked against 0.

If it is equal to 0, a new level is encoded for the current pixel "i". As a consequence, the value of the pixel at position "i" is set equal to the level at the index "j" from the table of levels; Block[i]=Level[j]. This is step 1105. The variable "i" is incremented by one at step 1106 to consider the next pixel, and the variable "k", dedicated to count the pixels already processed in the current Run, is set equal to 0 at step 1107.

A check is performed at step 1108 to determine whether or not k is equal to the "Run" element of the table of runs at the index j: k=Run[j]?. If not equal, the level of the pixel at position i is set equal to the level value of the pixel at position i−1: Block[i]=Block[i−1]. This is step 1109. The variable i and the variable k are then incremented by one at respectively steps 1110 and 1111. If k=Run[j] at step 1108, the propagation of the left level value is finished and step 1120 is performed (described below).

If Pred_mode[j] is different from 0 at step 1104, the "copy up" mode starts with the variable "k" set equal to 0 at step 1112. Next, step 1113 checks whether or not (k−1) is equal to the "Run" element of the table of runs at the index "j": k=Run[j]+1? If not equal, the level value of the pixel at position i is set equal to the level value of the pixel at position i of the above line: Block[i]=Block[i−width], where "width" is the width of the block of levels (the same as the coding unit) as deduced from the input size of the coding unit. This is step 1114. Next, the variable "i" and the variable "k" are incremented by one at respectively steps 1115 and 1116. If k=Run[j]+1 at step 1113, the prediction mode 'copy up' is completed and the process goes on at step 1120.

At step 1120, a check is performed to determine whether or not the variable i is equal to the amount of pixels in the block 91/CU 801. If not equal, the variable j is incremented by one at step 1121 to consider the next set of syntax elements and the process loops back to step 1104 described above.

If all the pixels have been processed at step 1120, the final block of levels 91 is obtained at step 1122: this corresponds to table Block[ ]. Then a final step 1123 consists in converting each level in colour values using the palette 803 decoded using the process of FIG. 10. This final step affects pixel values (Y, U, V) or (R, G, B) at each block position according to the level of this position in the block and the corresponding entries in the palette.

Other aspects of the palette mode as introduced in HEVC RExt regard the determination by the encoder of the palette to be used to encode the current coding unit (see FIG. 12 below), and the selection of the Pred mode, Level and Run syntax elements at the encoder (see FIG. 13 below).

Figure 12:
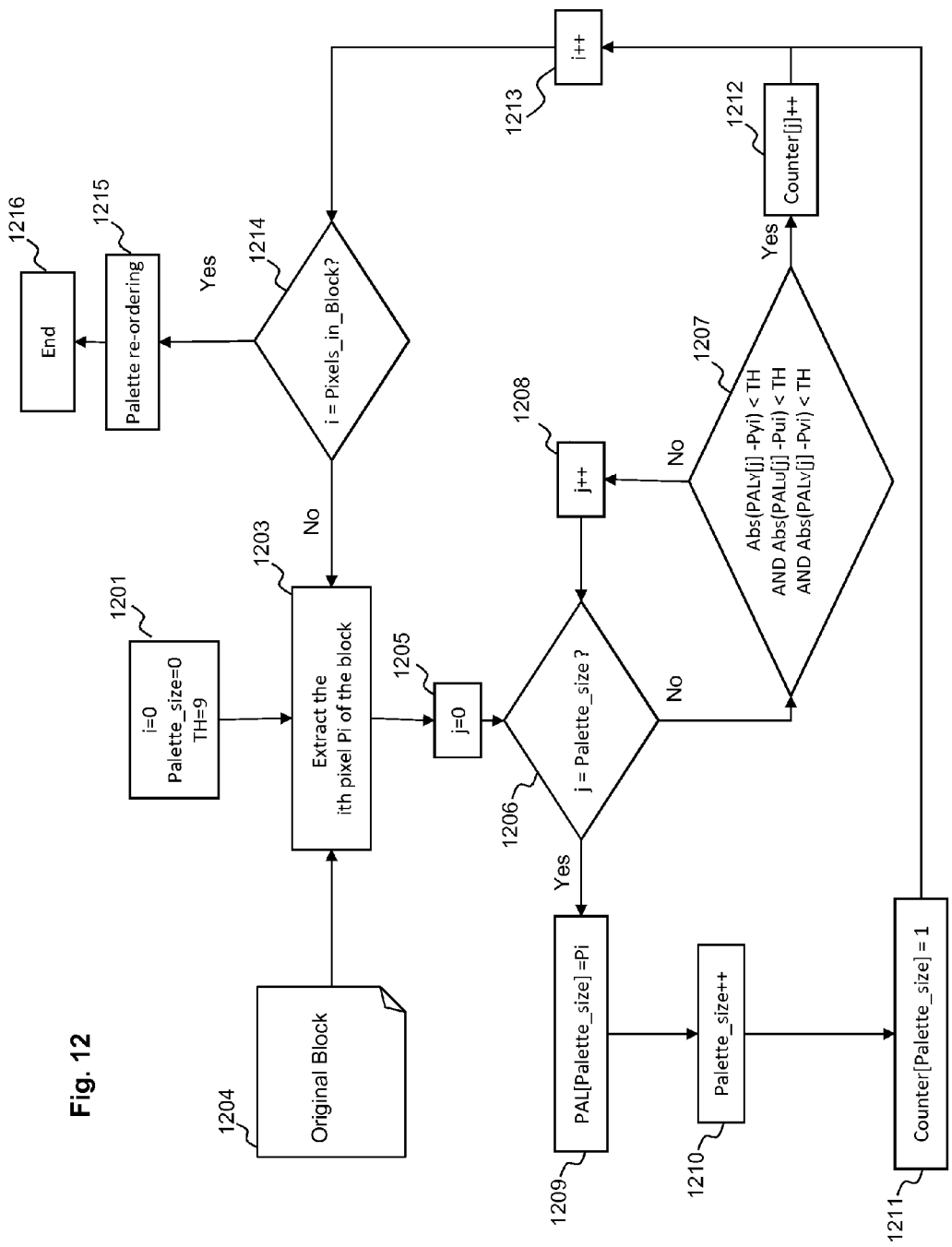
FIG. 12 illustrates an exemplary palette determination algorithm at the encoder.

FIG. 12 illustrates an exemplary palette determination algorithm at the encoder. The input data of this process are the original coding unit of pixels and its coding unit size. In this example, a YUV palette is built, but other implementations may result in having a RGB palette built in the same way.

At a first step 1201, a variable j representing a pixel counter is set to 0, a variable "Palette_size" to follow the growth of the palette as it is being built is also set to 0, and a variable "TH" representative of a threshold is set to 9. Then at step 1203, the pixel $p_i$, i.e. having the index i according to a scanning order, is read at step 1203 from the original coding unit 1204. Then the variable j is set equal to 0 at 1205 and at step 1206 a check is performed to determine whether or not the palette size is equal to the variable "j" (meaning that all the palette elements of the palette under construction has been considered).

If the palette size is equal to j, the palette at the index "j" is set equal to the pixel value $p_i$ at step 1209. This means that the current pixel $p_i$ becomes a new element in the palette, with index j associated with it. More precisely the following assignment is performed:

$PAL_Y[j]=(Y_i)$
$PAL_U[j]=(U_i)$
$PAL_V[j]=(V_i)$ where $PAL_{Y,U,V}$ are three tables to store the colour values.

The palette size (Palette_size) is incremented by one at step 1210 and an occurrence table Counter is set equal to 1 for the index 'Palette size' at step 1211. Then the variable i is incremented by one at step 1213 to consider the next pixel "i" of the current coding unit. A check is then performed at step 1214 to determine whether or not all the pixels of the current coding unit have been processed. If they have all been processed, the process is completed by an ordering step 1215 explained later on, otherwise the next pixel is considered at step 1203 described above.

Back to step 1206, if j is different from palette_size, step 1207 is performed where the absolute value for each colour component between $p_i$ and the palette element at the index j is computed. The formulas are shown in the Figure. If all the absolute differences are strictly less than the predefined threshold TH, the occurrence counter regarding the element "j" in the palette is incremented by one at step 1212. Step 1207 creates a class for each element of the palette under construction, such a class encompassing colours neighbouring the colour of the element, given the margin TH. Thus step 1212 counts the occurrences of each class. Step 1212 is followed by step 1213 already described.

In the condition of step 1207 is not met, the variable j is incremented by one at step 1208 to consider the next palette element in the palette. This is to compare the other palette colour elements to the current pixel through new occurrence of step 1207. If no element in the palette meets the criterion of step 1207, a new element is added to the palette as described above with reference to steps 1209, 1210 and 1211.

One may note that the decision module 1207 can compared each color element for a 4:4:4 (YUV or RGB) sequences and can only compare the Luma colour component for 4:2:0 sequences.

At the end of the process of FIG. 12, the table "Counter" contains the number of occurrences of the classes defined by the respective palette elements. Then the palette elements are ordered at step 1215 according to their occurrences so that the most frequent element is in the first position (entry with the lowest index or "level") in the palette.

One may also note that the size of the palette can be limited to a maximum size, for example 24 entries. In such a case, if the size of the palette resulting from step 1215 exceeds 24, the palette is reduced by removing the elements (entries) from the 25$^{th}$ position in the ordered palette. It results that a palette has been built.

Figure 13:
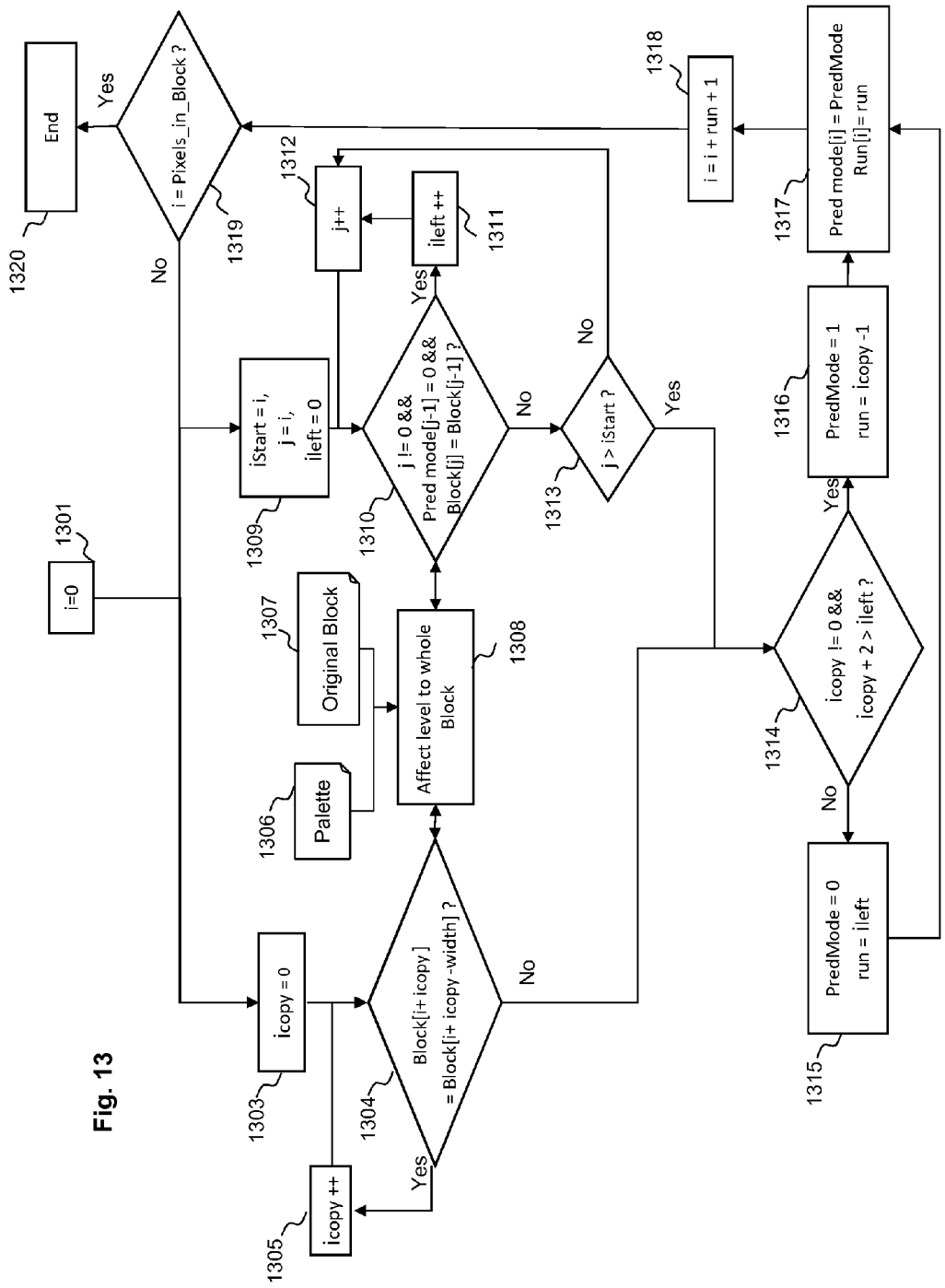
FIG. 13 illustrates the selection of the Pred mode, Level and Run syntax elements at the encoder.

Turning now to the selection of the Pred mode, Level and Run syntax elements at the encoder, input data of the process of FIG. 13 are the original coding unit of pixels, the palette as built through the process of FIG. 12 and the coding unit size. In particular, this evaluation is performed when determining which coding mode between INTRA coding, INTER coding and Palette coding has to be used.

At a first step 1301, the variable "i" representing a pixel counter is set to 0. The process described below seeks to determine the syntax elements for the pixels starting from i. The two modes of prediction are evaluated independently: "Pred mode"=0 on the right hand part of the Figure, and "Pred mode"=1 on the left hand part of the Figure.

For the 'copy up' prediction (corresponding to "Pred mode"=1), the variable "$i_{copy}$" used to count the number of levels in the current Run is set equal to 0 at step 1303. Then at step 1304, the current level at pixel location i: Block[i+$i_{copy}$], is compared to the level of the pixel located just above in the above line: Block[i+$i_{copy}$−width], where "width" corresponds to the width of the current coding unit. Note that the level Block[i+$i_{copy}$] of each pixel of the coding unit is determined in parallel at step 1308. This step consists in associating with the pixel at the position i, the closest palette element (in practice its index or level) as already explained above. This step uses the position i, the palette 1306 and the original coding unit 1307.

If Block[i+$i_{copy}$]=Block[i+$i_{copy}$−width] at step 1304, the variable "$i_{copy}$" is incremented by one at step 1305 to consider the next pixel value of the block of pixels and to indicate that the current pixel level at position i+$i_{copy}$ can be included in the current "copy up" Run. If Block[i+$i_{copy}$] is different from Block[i+$i_{copy}$−width] at step 1304 meaning that the current evaluation of a "copy up" Run has ended, the variable "$i_{copy}$" is transmitted to the decision module 1314. At this stage of the process, the variable "$i_{copy}$" corresponds to the number of values copied from the line just above.

For the left value prediction (corresponding to "Pred mode"=0), the loop to determine the Run value ($i_{left}$) is processed in parallel or sequentially. First the variable "$i_{Start}$" used to store the index i of the current pixel is set to "i", and the variable "j" used to consider successively the pixel levels following index "i" is also set equal to "i" and the variable "$i_{left}$" used to count the current Run under construction is set equal to 0. This is step 1309. Next, step 1310 consists to determine whether or not j !=0 and "Pred_mode[j−1]"=0 and Block[j]=Block[j−1]. Pred_mode[ ] is a table used by the encoder to store the prediction mode (either 1 or 0 for respectively the "copy up" prediction and the left value prediction). It is filled up progressively at step 1317 described below as the successive pixels are processed, and has been initialized with zero values for example at step 1301: Pred_mode[k]=0 for any k.

More generally, the left value mentioned in the "left value prediction" or "copy-left" below is actually the value of the last decoded pixel. It happens to be the value of the pixel at the left of the current pixel, but also, if the current pixel is the first in the row, the last pixel in the previous row.

If the condition at step 1310 is met, the variable "$i_{left}$" is incremented by one at step 1311 to indicate that the current pixel level at position j can be included in the current "left value" Run, and the variable j is incremented by one at step 1312 to consider the next pixel value of the block of pixels.

If the condition at step 1310 is not met, the variable "j" is compared to "$i_{Start}$" to determine if it is the first pixel value to be examined for the current "left value" Run. This is step 1313. If "j" is equal to or less than "$i_{Start}$", meaning that it is the first pixel value to be examined for the current Run, then it starts the current Run and the next pixel value is considered at step 1312 described above. If "j" is strictly higher than "$i_{Start}$", meaning that a first pixel value different from the pixel value of the current "left value" Run has been detected. The variable "$i_{left}$" which corresponds to the length of the current "left value" Run is transmitted to the decision module 1314. Note that, as the loop for "copy up" prediction, the level Block[i] at the index i is determined in the same loop at step 1308.

After having computed the maximum run for the 'left value prediction' and the 'copy up' mode, the variable "$i_{left}$" and "$i_{copy}$" are compared at step 1314. This is to determine whether or not "$i_{copy}$"!=0 and "$i_{copy}$"+2 is higher than "$i_{left}$". This is an exemplary criterion to select either the copy up mode or the left value prediction mode. In particular, the parameter "2" may be slightly changed.

The condition at step 1314 means that if "$i_{copy}$" is equal to 0 or is smaller than or equal to $i_{left}$−2, the "left value prediction" mode is selected at step 1315. In that case, a "PredMode" variable is set equal to 0 and a Run variable is set equal to "$i_{left}$" at same step 1315. On the other hand, if "$i_{copy}$" is different from 0 and is strictly higher than "$i_{left}$−2", the "copy-up" mode is selected at step 1316. In that case, the "PredMode" variable is set equal to 1 and the Run variable to "$i_{copy}$−1" at step 1316.

Then the tables containing the "Pred_mode" and the "Run" at the encoder are updated with the current value "Pred_mode" and "Run", at step 1317. Then, the next position to consider in the block of pixels is computed at step 1318, which corresponds to the current position i incremented by the "run" value+1. Then a check is performed at step 1319 to determine whether the last pixels of the coding unit have been processed. If it is the case, the process ends at step 1320, otherwise the evaluation of the two prediction modes "left prediction" (i.e "index mode") and "copy up" are evaluated starting at steps 1303 and 1309 for the next pixel position to obtain a new set of syntax elements.

At the end of this process, the encoder knows the levels for each sample of the coding unit, and is able to encode the corresponding syntax of the block of levels based on the content of the three tables Pred_mode[ ], Block[ ] and Run[ ].

Figure 14:
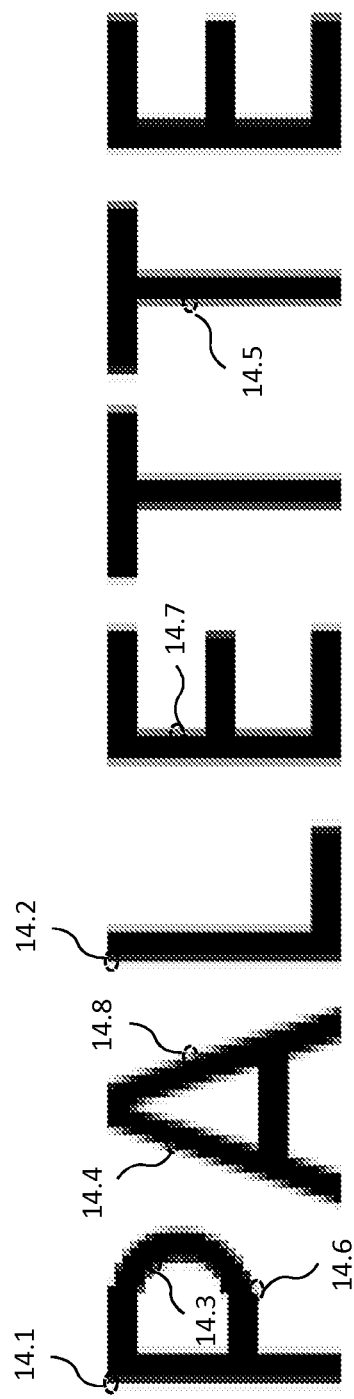
FIG. 14 illustrates background knowledge related to the invention.

FIG. 14 represents an example of real-world situation of a case where palette coding is efficient. The data to code here is made of 9 different values of greys (from white to black). We have several pairs of pixels identified by the elements 14.1 to 14.8. We can observe that the pairs 14.1 and 14.2 are strictly identical, and consist of a light grey followed by black color. Regarding the pairs 14.3, 14.4 and 14.5, they are also identical and consist of a dark grey followed by black color. Finally, the pairs 14.6 to 14.8 start with a black color and are followed by different values of grey.

In that example, we clearly show that the pattern 14.2 can easily be predicted based on the previous pattern 14.1. The same kind of reasoning can be done regarding the pattern 14.5 that can be easily predicted from the previously treated part of the image since the patterns 14.5, 14.4 and 14.3 are exactly the same.

One aspect of this invention is to take advantage of the previously encoded or decoded patterns to predict future patterns. It is proposed to complete the current Palette modes with a new pattern mode that can be signaled in addition to the current "copy above" mode and the "left prediction" mode currently signaled by the "Pred mode" syntax element.

Figure 15:
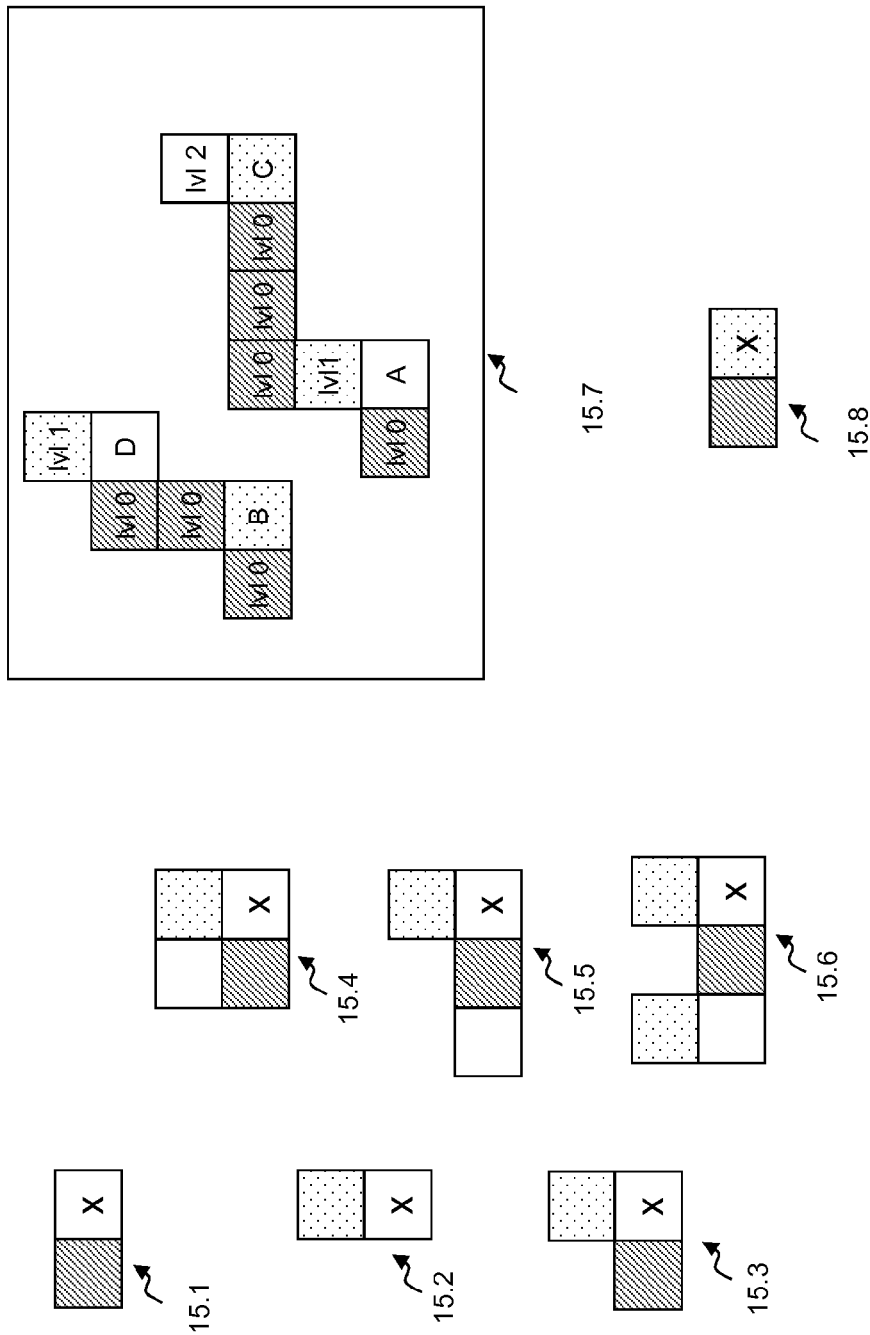
FIG. 15 illustrates patterns related to the invention.

FIG. 15 illustrates further the principle of a pattern prediction. Because transitions between pixels are quite predictive and some patterns are quite repetitive in the "screen content" sequence, it is interesting to exploit the information about the occurrence of some patterns for prediction. A pattern is composed of several pixels. The principle of the improvement of the Palette mode is to predict a pixel level according to already coded neighboring pixels. To reach this goal a certain number of patterns will be stored in memory in addition to the palette entries. They will then be used to predict a given pixel according to the value of its neighboring pixels.

The different elements of FIG. 15 give some examples of patterns that could be used for prediction. For the pattern 15.1, this pattern is composed of two pixels and the pattern prediction mode applied to the Palette mode will consist in predicting the level of pixel "x" according to the pixel level of the pixel immediately on the left (here a dark grey). Similarly, pattern 15.2 shows a two-pixel pattern arranged in a vertical manner compared to the pattern 15.1 and where the neighbor is a light grey.

Regarding the drawing 15.3, the pattern is composed of three pixels. The prediction mode will take into account the left element and the above element to predict the pixel level "x". The drawings 15.4 and 15.6 show other possible patterns that may be used for prediction.

It is worth noting that patterns are advantageously updated during the encoding. For example, when considering pattern 15.1, this pattern is memorized when going through the encoding of a "x" white pixel preceded by a dark grey pixel. If afterward, the encoding of the block of levels goes through the encoding of a "x" pixel being light grey preceded by a dark grey pixel, the pattern is updated to pattern 15.8. The last updated pattern is to be used for prediction.

Configuration 15.7 illustrates some pixels configuration that may be found in a block of levels to encode. As an example in the configuration 15.7, if we consider a two-element pattern as in the drawing 15.1, the level for the left pixel for A, B, C and D is level 0 (lvl 0).

It may be considered having two patterns like 15.1 and 15.3 to process the block/CU 15.7. Considering pixel D, the horizontal two-pixels pattern 15.1 is a perfect prediction since knowing the left value of the pattern (dark grey) you can predict the pixel value (white) of pixel D.

When considering pixel B, the pattern 15.1 cannot be used, since the pixel value of B is light grey and does not correspond to the pattern 15.1 in memory where the pixel value of the right pixel is white. The same mismatch happens for the pixel C.

However, if the pattern 15.1 would have been updated after processing the pixel B by the pattern 15.8, the match is also perfect.

As can be seen, a variety of definitions can be made for the pattern depending on the numbers of pixels that it contains and their respective arrangement (vertical, horizontal or any).

It is contemplated to modify the palette coding mode as it is described in the foregoing. Two main embodiments are considered where new information for prediction can be stored in addition to the current palette. These new information is about the patterns.

The level values of the considered patterns are stored in memory. For sake of description, we will consider in our description in order to keep a homogeneous set of patterns containing only horizontal two-pixels patterns with different colours. However, the invention is not limited to this restriction and can be easily extended by a person skilled in the art to other kind of patterns (for example like patterns 15.1 to 15.6) represented in FIG. 15.

A pattern is defined as level values of one or more neighbour of a pixel of the block of levels. This pattern is associated with a level value corresponding to a prediction of the level value of a pixel surrounded by said pattern. In one embodiment, the association of the prediction value with the pattern is made by introducing the prediction value in the pattern table, for example see the right column of table represented in FIG. 16.b. In another embodiment, this association may be done by giving a position in the block of levels of a pixel having the prediction value, see for example the table 17.b.

In the current Palette coding mode, a certain number P of elements or entries are present in the Palette. This corresponds to the representation in FIG. 16.a where P=6 palette entries are represented. For this particular embodiment, we will use a set of patterns for prediction. In that case, the storage of the two-pixels pattern can be performed using an additional table as represented in FIG. 16.b. This pattern table contains at maximum 6 entries in the chosen embodiment. If we select a pattern such as 15.3, there will be P=6 possible values for the pixel left of 'x', and P=6 possible values for the pixel above, thus 36 total possible patterns. The left level column of this table corresponds to the level of the left value of the pattern 15.1 and the right column corresponds to the value of the pixel 'x'.

The main principle of this embodiment is to collect in the pattern table of FIG. 16.b the last right level (for this example) of the occurrence of the pattern during the block of levels processing so that it can be used then as a prediction for the next following pattern which has the same left level. For example, in the pattern table of FIG. 16.b, for a couple (left level, right level), the principle is to store the last encountered occurrence of the pattern during the encoding of the block of levels.

For this method, an additional flag may be used in the Palette mode in order to signal if the traditional palette table is used or if a pattern table is used.

Through some real experiments in the HEVC Range Extension Reference Software, this method has proven to provide higher coding efficiency since it enables to use pattern as prediction of the coding of the block of levels samples. This is quite natural since in the "screen content" coding sequences the patterns are highly repetitive.

It is worth noting that in one embodiment of the current invention the pattern table is immediately updated after a new pattern (having the same left value in our example) has been found. For example, if during the processing of a given block of levels, we found that a pattern (left level=4, right level=2), the pattern table is immediately updated to contain this new value to replace the current entry (left level=4, right level=4). This updated pattern table is then used for further processing. It can be further noted that, in this embodiment, patterns are advantageously updated only when the "prediction left" mode is used, as this mode introduces new values of level and transitions.

In another embodiment the update is performed only if a significant number of occurrences of a given new pattern have been found. This means that the pattern table is not immediately updated after a new pattern has been found. For example, the update occurs when the pattern has been found K times consecutively. In that case, K may be signaled in the bitstream or is fixed and thus known from the encoder and the decoder. Of course, other update mechanisms to change the entries of the pattern table may be contemplated.

As we mentioned earlier, our embodiment is illustrating a horizontal two-pixels pattern. It that case, the updated mechanism is quite simple. In the case where the pattern is composed of more than 2 pixels, more operations are needed to update the pattern table due to the possible combinations.

In the current example illustrated on FIG. 16.*b*, the number (P') of entries for the pattern table is the same as the palette table (P=6). Since we are using a horizontal two-pixels pattern, the maximum size cannot exceed P. However, the pattern table could be of a smaller size and its size (P', P'<P) could be signaled in the bitstream. This is a way to control the coding efficiency/memory tradeoff. Of course, in the case of different kind of patterns, this can be easily be extended by the man skilled in the art: for instance, for a pattern using left and above neighbors, the storage can be restricted in a similar fashion to be P'×P' elements instead of P×P.

It may be possible to consider using several instances of pattern tables. For example, additionally to the last occurrence pattern table, the penultimate pattern may be used and stored in an additional table. In that case, it may be necessary to define an implicit way (e.g. 1 case out of 2) or explicit (transmitted in the bitstream, e.g. adding or modifying a syntax element such as the mode) to identify which of the different tables must be used to encode or decode a given level value.

FIGS. 17*a* & 17*b* illustrates a pattern table used in an embodiment where the position of the pattern is used. In this embodiment, we are considering another coding mode in addition to the "left prediction" and the "copy above" mode based on the pattern position as illustrated. In that particular mode, the positions of the patterns in the block of levels are stored. During the processing of the block of levels for palette coding, we will introduce at least one new copy mode "copy from pattern" that enables copying the level values from a pattern previously encountered in the causal area. The behavior of this embodiment is detailed in relation to FIG. 21.

Regarding mode illustrated in FIGS. 16 and 17, some additional embodiments are proposed.

First, a further embodiment concerns an improvement regarding the initial content of the pattern tables illustrated in FIGS. 16*b* and 17*b*, also called transition tables. Indeed, the table may be updated as the block is processed, but its initial state needs to be specified. One first consideration is to fill the initial transition tables of FIGS. 16*b* and 17*b* with the most probable level values e.g. level values that will have high probability to then appear for the copy transition mode. For instance, we may assume that the level values in the palette table are sorted from the most probable value to the least probable value. Consequently, 0 may be considered to be the most probable right level (i.e. the level most frequently occurring) for a the "copy transition" mode from any previous left level except when the previous left level is equal to 0 itself. In that particular case, it is preferable to select the second most probable level which is 1. Furthermore, a level in the palette table might be used to indicate escape coding, not constituting an interesting level to be taken into account for the copy transition mode.

As already explained above, the escape coding method comprises inserting an escape flag only if the Palette reaches the maximal number of values that it can contain. In this case, the Palette contains only MAX−1 indexes (MAX being the maximal number of values that it can contain), the value at the position MAX in the Palette being the escape level.

Therefore, in that particular case where an escape coding is used, the initialization step of the pattern or the transition table should avoid setting and storing a transition corresponding to the level indicating the escape level in the palette table. Indeed, this transition with this escape index as the left level would never happen.

According to another embodiment, the transition or pattern table might be reusable from block to block, for instance if a block completely reuses or shares the palette table of a previous block. In that case, it is advantageous not to initialize the transition table but instead to leave it to its latest state corresponding to the previous block.

Figure 18:
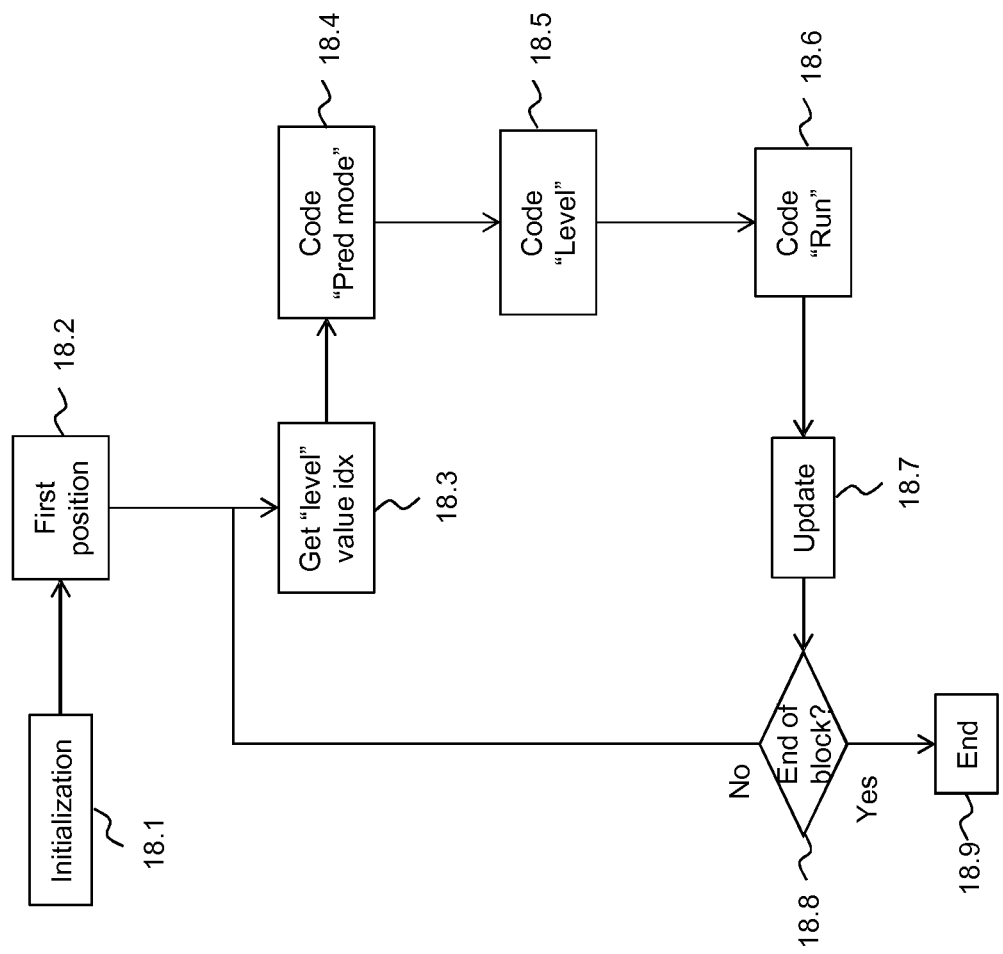
FIG. 18 represents a simplified representation of the palette method at the encoder side.

FIG. 18 represents a simplified representation of the palette method already described in the foregoing. This figure summarizes the three main steps of the palette mode and how it is affected in an embodiment of the invention.

In step 18.1 several operations are considered as already performed, e.g. the palette is already determined and the block of levels has already been calculated. It means that the coding of the block of levels can start with the first pixel in step 18.2. In step 18.3, the level on the pixel is obtained.

The next step is to encode the "Pred mode" in step 18.4. In the case of 2 modes, this is a simple bit flag. It is set to "0" if the "left prediction" mode is used. Otherwise, this "Pred mode" flag is set to "1" to signal if the "copy above" is used.

Depending on the value of the "Pred mode" flag value, the level coding is performed is step 18.5. When the "Pred mode" is set to "1", no "Level" is coded and when the "Pred mode" is set to "0", the "level" is coded as described in FIG. 10.

Then the next step is 18.6 where the run length of the mode is encoded in the bitstream as the syntax element "Run", for instance with an exponential Golomb code of order 3. This step is followed by step 18.7 where in the current palette mode the position of the pixel is incremented depending on the value of the syntax element "Run".

Figure 19:
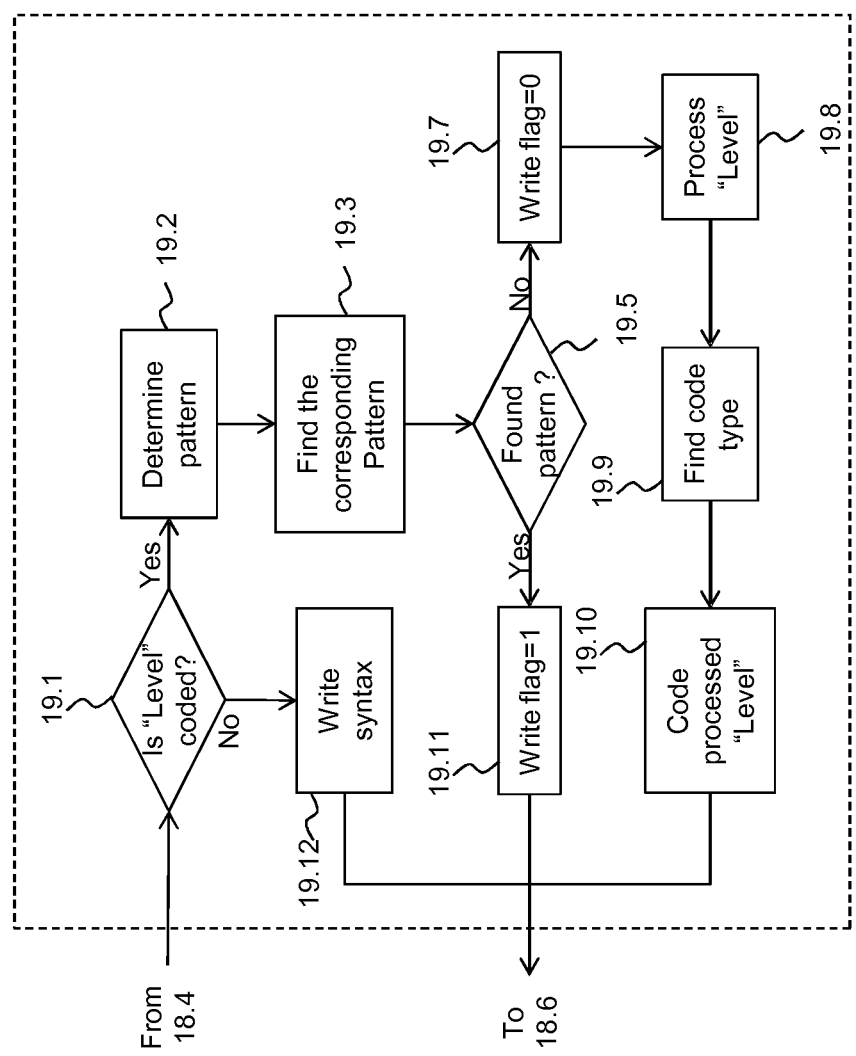
FIG. 19 illustrates more in detail an embodiment of the use of the pattern table according to the FIG. 18.

FIG. 19 is the detailed description of the use of the pattern table which is used as a modification of the step 18.5 in FIG. 18 related to the coding of the syntax element "Level". More specifically this figure describes the step 18.5 according to an embodiment of the invention.

This embodiment aims at modifying the copy left prediction mode to avoid the direct encoding of the level value in the bitstream. By comparing the neighborhood of the current pixel to memorized patterns in the pattern table, it may be possible to identify a pattern corresponding to this neighborhood. When a pattern is found and if the level value corresponds to the level value predicted by the pattern, a flag is used to signal that the pattern may be used to retrieve the level value. Therefore the direct encoding of the level value is saved in the copy left prediction mode.

The copy left prediction mode is the name given to the mode when Pred mode is equal to zero.

In step 19.1, it is determined whether the "level" should be coded or not. As mentioned earlier, this depends on the "Pred mode" value. This consists in the preferred embodiment in checking whether the mode is "left prediction". If such is not the case, then any remaining specific syntax, if any, for the current mode is written during step 19.12. In the preferred embodiment, the only mode going down that path is "copy above", and no syntax actually needs to be written. Then common step 18.6 of the previous figure then writes the run length using any specific means.

Otherwise if a positive answer is given in step 19.1, the level needs to be encoded. Step 19.2 determines the pattern associated with the current position of the pixel being processed. In our preferred embodiment, the value of the previous level value, which corresponds to the left pixel, is used as the pattern corresponding to a horizontal two-pixels pattern. If the pattern has not occurred yet, or cannot be built, for example because there is no index above for a vertical two-pixels pattern or because there are missing pixels at frontier of the image for larger patterns, a default element of the pattern table can be used instead, for example a pattern index equal to 0 in the case of a two-pixels pattern (vertical, horizontal, . . . ).

Then, step 19.3 can occur. It retrieves the information associated to the pattern. This step consists in identifying from the pattern table the pixel level of the left pixel and check if the current pixel corresponds to the level value of the right pixel. If the pattern is found is the table, meaning that the value of the current pixel in the Block/CU and its preceding value corresponds to one pattern in the table, we can predict it and use a simple flag to represent it.

Therefore, on step 19.5, if the pattern is found then step 19.11 occurs and only one flag (bit) is written so as to indicate to the decoder that by using the same pattern identification process and the pattern table the level value can be reliably predicted. The value of the bit is of course a convention matter, and we have chosen 1 here. One can consider that this flag, in addition, uses a CABAC context to improve even further the coding efficiency, as is well known by the man skilled in the art. Once step 19.11 has occurred, then the next step 18.6, already described in FIG. 18, can occur.

If, on step 19.5, it is found that no pattern matches, then step 19.7 occurs. It is the opposite of step 19.11, as the opposite value of the flag is written to the bitstream. Step 19.8 can then occur. It means that the current pixel must be treated as a new level from the color palette that needs to be encoded. Knowing that information (e.g. the corresponding pattern does not match), the number of potential "level" is therefore reduced by one, as the right level from the pattern is not the one considered. One can for instance decrement by one the "level" value if it is above the right level of the pattern: indeed, at the decoder, any "level" value greater or equal to this right level can be identified as having been decremented, and can be incremented back to one. We can exploit this additional information to introduce shorter entropy codewords to encode the incoming "Level" syntax element.

As already introduced, there are two important considerations to be made here. First, due to complexity constraints, it may be advantageous to store less than those P elements in the table of patterns. It is actually possible to physically store only P' (P'≤P) elements, the P'−1 first elements corresponding to values of pattern ranging from 0 to (P'−2), and the case of (P'−1) being used to handle any pattern where the index exceeds (P'−1). Therefore, if the pattern index is ≤N−1, then we are addressing the pattern table otherwise all pattern indexes are redirected to a single table entry (P'−1). The value of P' is a compromise between coding efficiency and complexity.

Step 19.9 can then occur, where an entropy code adapted to coding the remaining part of the "Level" is selected. In one embodiment, a binary code on b bits (as the original proposal) is used where the value of b is selected so that $2^b \geq P$. In the preferred embodiment of this invention, the fixed length binary code of said code is replaced by an Exponential-Golomb code of order b>>1.

Once the code to use has been determined, step 19.10 codes the processed "level" value (e.g., that may have been decremented) and then goes to step 18.6 of the previous FIG. 18. We already mentioned how step 18.6 encodes the runlength. It is well understood that any means may be employed here.

Then going back to FIG. 18, step 18.7 can occur. In any case, it will update the current position according to the runlength, typically if its value is R, then the pixel position is incremented by R. In addition, specific operations are performed according to the embodiment of the invention. For example, if the current pixel (before the run) was not coded by using the pattern table, it means that the pattern table was probably not a good predictor. During this step an update mechanism may be provided. For example, the update mechanism can be simple and replace the prediction value associated to the current pattern in the pattern table by the one that really occurred for the current pixel.

Furthermore, in a further embodiment the update step also stores further information about the frequency of occurrence of the pattern, for instance how many times it has happened. This frequency is then used to conditionally update the storage of the pattern: indeed, if the current occurrence is a rare one, it is better to keep the old one which is considered as the most frequent one. This embodiment can be performed in the following steps:

If a given pattern has been found, then its frequency is incremented by one;

Otherwise, the frequency of the pattern (having the same left level) in the pattern table is decremented by one and:

If its frequency is above a threshold, nothing further happens;

Otherwise, the new found pattern replaces the memorized pattern.

Please note that, as these frequencies need to be stored for each pattern (thus up to P' values according to the pattern table), it may be advantageous to have only one flag. In that case, the flag value cannot go beyond 1, and as soon as it would be decremented below 0, the value of the pattern is replaced by the new one, and the flag value stays at 0.

Now that the update of FIG. 18.7 is completed, the updated position is compared to the end of the block during step 18.8. If the last position is reached, then process ends at step 18.9, otherwise it loops back to step 18.3 already described.

It is important to note that from a decoder point of view all the operations of this invention described here are similar and performed in a reverse way. The same principle as described in FIG. 10 may be applied in the same way.

Figure 20:
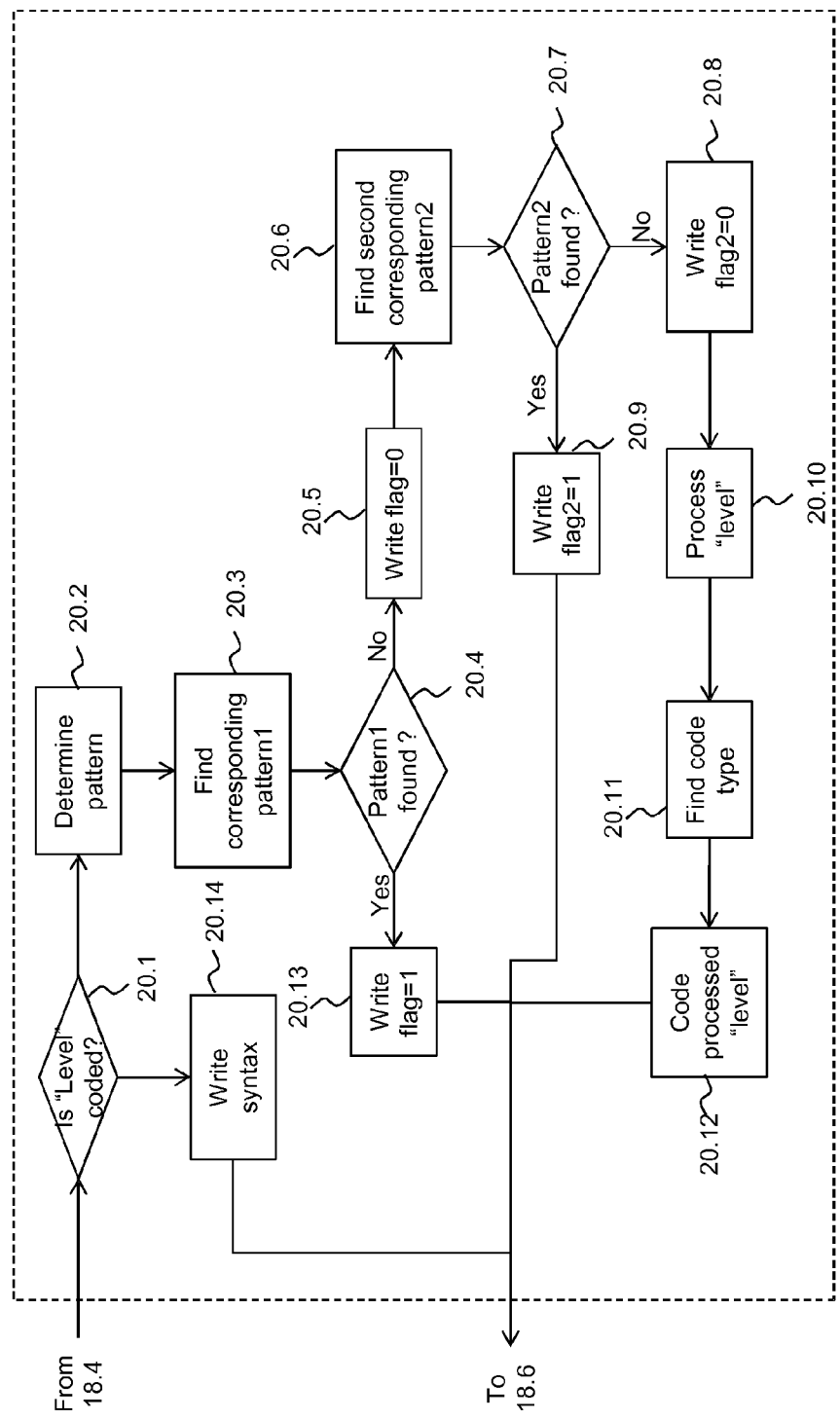
FIG. 20 illustrates an embodiment of the use of two pattern storages at the encoder side.

FIG. 20 illustrates the use of two pattern storages. Steps 20.1 to 20.3 are similar to the previous embodiment.

In this embodiment, a second, and possibly more, pattern table is added. By doing this, it is possible, for a same pattern, to get several different predicted level values. A flag indicating which pattern table should be used to retrieve the right level value is added. Accordingly, the chance to be able to get rid of the direct encoding of the level value in the copy left prediction mode is increased.

Let us then start on step 20.4. If the first pattern (pattern1) is found in the corresponding first pattern table then step 20.13 (identical to 19.11) occurs and goes directly to step 18.6, otherwise step 20.5 (identical to 19.7) occurs. New step 20.6 retrieves the second pattern and identifies the "pattern2" of the current pixel in the second pattern table. Of course, the second pattern may differ from the first pattern. The first pattern could be a two-pixels pattern, while the second pattern is a three-pixels pattern. Of course, other alternatives may be contemplated here, e.g. the first pattern is a horizontal two-pixels pattern while the second pattern is a vertical two-pixels pattern.

In any case, a check is performed in step 20.7 is similarly to step 20.4. If the current pattern at the current pixel position corresponds to a pattern stored in the second pattern table, a second flag of value 1 is written during step 20.9 (equivalent to 20.13). Otherwise, step 20.8 writes the opposite flag value. In any case, step 20.8 is followed by step 20.10. This means that no pattern has been identified in the first and the second pattern tables and consequently the current pixel position must be treated as a new "Level". In that case, the value of the level of the palette will be used as usual.

Then, step 20.11 (similar to step 19.12) find the optimal entropy code that is then used in step 20.12 to encode the processed "level". The processing then goes back to step 18.6 to proceed the same steps of run length coding.

Similar updates mechanisms are performed in step 18.7 to modify and update the two pattern tables according to occurrences of the encountered patterns.

Figure 21:
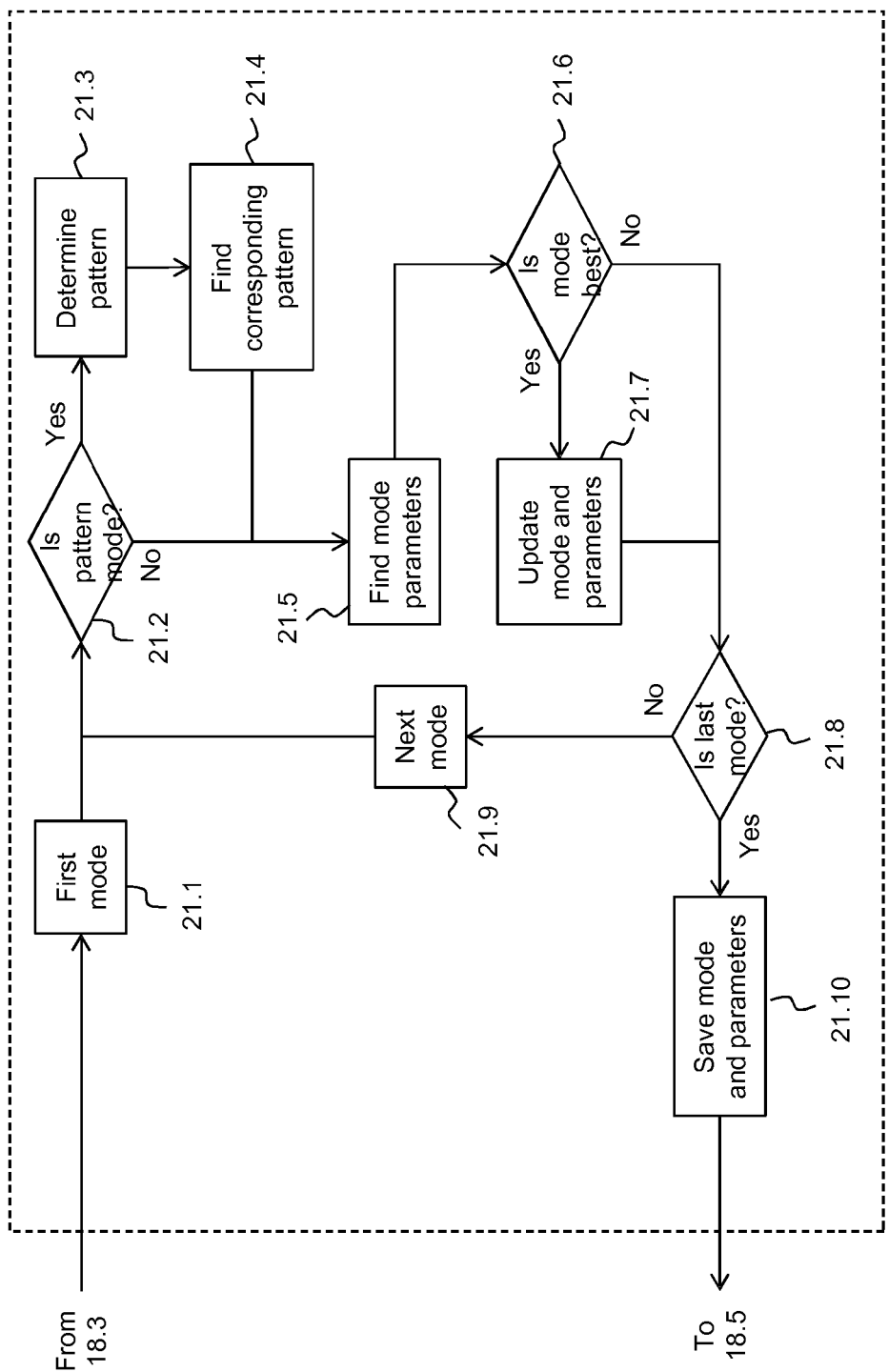
FIG. 21 illustrates more in detail an embodiment of the step for coding a "Pred mode" in the Palette mode.

In the previous figures, we have illustrated the 2 modes ("left prediction" and "copy above") of the palette mode coding tools. FIGS. 18 and 19 introduced two embodiments of the invention based on the use of patterns. At least one flag was introduced to indicate the usage of one or more pattern tables for prediction. In FIG. 21, we are illustrating one embodiment of the invention that uses new modes. As a consequence, entropy coding of mode information ("Pred mode") as described in the table of entropic codes (see FIG. 10) for the syntax element must be modified, for instance by using a truncated unary code where 0 indicates "left prediction", 1 indicating "copy above" and 2+N representing the $N^{th}$ new "copy from pattern" mode. It has been found however, that the best configuration is:

0 indicates "left prediction" (identical to original method);

1 indicates "copy from pattern" mode 1;

2 indicates "copy above";

N>2 indicates "copy from pattern" mode N−1.

To be even more specific, this results in the following codewords and predictions modes illustrated in Table 1:

TABLE 1

Codewords associated to each mode.

| Codeword | Mode |
| --- | --- |
| 0 | Copy left prediction (i.e. "left prediction mode" or "index mode") |
| 10 | Copy transition |
| 11 | Copy above |

The above bits can be encoded using CABAC contexts (well known by the man skilled in the art), i.e. a bit is encoded according to the estimated probability of it being 0 or 1 in a given situation. Here the prediction mode of the index on the line above (this is the raster can order) can be used as being the context. Then each bit of the codeword can be encoded using that context. As a variant, the context could be the last prediction mode. Indeed, it has been determined that when using at least one copy transition mode, using as context the last prediction mode (i.e. the one used for predicting the last level in raster scan order) provides better coding efficiency.

In this new "copy from pattern" prediction mode, the predicted level value is no more stored in the pattern table. Instead of the predicted value, a position in the block of levels where the predicted level value may be found is memorized in the pattern table as illustrated on FIG. 17.b. The repetition syntax element "Run" has a new meaning. It does not indicate the number of identical repetition of the level value, but the number of pixels that may be retrieved from the indicated position in the block of levels. It should be understood that this position should be in the previously encoded, or decoded, part of the block of levels due to the causal principle. This also means that the complete causal area should be memorized at decoding to be able to retrieve level values from any point in this causal area. In some embodiments, in order to keep the size of the buffer used to store the causal area reasonable, the patterns allowable for this "copy from pattern" mode is limited to those having a position close to the current position of the pixel being encoded or decoded. In other words, a threshold is determined on the extension from the current position to allow a position in the pattern table to be used. When the pattern corresponding to the current pixel has a position exceeding the allowed extension, the "copy from pattern" mode may be simply forbidden. Alternatively, a position within the allowed area may be determined to get a chance to find a predicted level value in the allowed area.

In FIG. 21, the embodiment of the invention consists in modifying the step 18.4 of the FIG. 18 where the "Pred mode" flag is processed. For sake of simplicity, we consider only one additional copy mode, let us call it "copy from pattern".

In step 21.1, the first copy mode is selected. On step 21.2, the inner loop, testing copy modes, starts. This step checks whether the copy mode being tested is a "copy from pattern" mode. This means that it is different from the previously known modes ("left prediction" (or index mode) and "copy above"). If it is not the case, it directly goes to step 21.5 and perform the "left prediction" and "copy above" modes as in the original palette coding method.

Otherwise, step 21.3 occurs. It is equivalent to step 19.2 or 20.2, where the neighborhood of the current pixel position is used to determine the pattern. This can be again a one-dimensional or a two-dimensional pattern, and the new "copy from pattern" modes could use different types of pattern. Then, step 21.4 retrieves the information associated to the current mode and in particular it identifies if the pattern exists. For this embodiment, we will refer to the table of FIG. 17.*b* which gives for each pattern the position where this pattern was encountered for the last time. This information consists in a given position inside the causal area. This position can be a default value (for instance if the pattern has not yet occurred) or a particular previous occurrence of said pattern. In the preferred embodiment, this previous occurrence corresponds to the previous occurrence of said pattern when the mode "left prediction" was used. This position corresponds to the position from which the copy operation will start from. In addition, the following considerations can be applied to obtain the position so as to, e.g., reduce memory usage:

Only part of the positions can be stored: in a computer system, the position is an integer represented as a field of bits, from which one can keep the N lowest significant bits, the remaining (most significant) bits being derived from current position most significant bits;

If the stored position is too far away from the current one, then an alternate position within range can be generated (e.g. setting it to the lowest allowable value, modifying the most significant bits of the position so that it satisfies the constraint).

Concerning the LSB/MSB consideration, imagine that one "copy from pattern" mode wants to encode indexes at position 250 (binary representation is 11111010) from a stored position of 176 (binary representation is 10110000):

If the allowed distance is bigger than 79, then the stored position can be used as is;

If the allowed distance is smaller, e.g. 64, then:

In one embodiment, a default position is selected, e.g. the oldest one, in which case the used position is (250−64)=186 in our case The point being that it is better to have some success, even if limited, in doing so than never trying In another embodiment, the default position is the position above (i.e., the mode becomes equivalent to "copy above");

The used position may be obtained by bit manipulation: N=6 LSBs of 176, i.e. xx 110000 (48), and remaining MSBs of 250, i.e. 11 xxxxxx (192), leading to position used being 48+192=240 (11 110000)—this method having the advantage that only the LSBs of the position need to be stored, saving on memory usage;

If the determined position is greater than the current one (thus overflowing), then further clipping or wrapping-around is possible:

If the position is 238 (11101110) instead of 250, then the above MSB/LSB selection would still lead to 240, which is above 238;

Therefore we can modify the least significant bits of the MSB (here, 11xxxxxx becomes 10xxxxxx) so that the generated position is below 238 (here, 10 110000, i.e. 176;

The above bit modification is equivalent to subtracting $2^N$ from the position;

In any case, it allows enforcing a maximal distance of $2^N$ from the current position.

Now that the position for the current mode has been determined, the encoder can employ whatever means to determine the optimal parameters for this mode in step 21.5. In particular, the run length can be determined here, and the simplest solution is to count the number of times the copy mode provides the exact same value that the current one. In addition, modes can have specific coding parameters, e.g. the index for mode "prediction left". Now that the coding parameters have been determined, step 21.6 evaluates the current mode and compares it to the current best. If the current mode is better, the best mode and its coding parameters are set to the current mode and its coding parameters during step 21.7.

In any case, step 21.8 occurs afterwards: it is checked whether the current mode was the last one or not, and if no, then testing of the next mode is prepared during step 21.9, before looping back to the next mode evaluation on step 21.9. If it was the last one, then the best mode and its parameters have been determined, and they can be saved during step 21.10 for later entropy coding. Then the step 21.10 is followed by the step 18.5 that will deal with the "level" syntax coding.

As for the "copy above" mode, if the mode "copy from pattern" is selected, no "Level" is coded and only the run length is coded in step 18.6. For the "copy from pattern" mode, the run length will indicate how many pixels from the position indicated in the pattern position table will be copied for the current pixel position currently processed.

Then, the next step 18.7 prepares for the next iteration. This step firstly updates the position according to the best mode found: indeed, the run length allows incrementing the position to the first index not yet predicted by the best copy method. In addition, an update relating to the storage management of the pattern information is performed. Indeed, the pixels that have just been encoded may represent a new pattern, which can be used for updating the ones stored. For instance, the pattern of the initial position can be evaluated as in 21.3 and the stored information updated with that initial position. In the preferred embodiment, this only happens when the best mode is "left prediction". In another embodiment, mechanisms similar to what is described in the foregoing may be used: the pattern position is updated to take into account any change related to the ongoing encoding process. Similarly statistics about the pattern and their respective position can be updated in different ways.

The current embodiment has been described with one new mode called "copy from pattern" compared to the "left prediction" and the "copy above" modes. We can easily extend the method by considering adding more than one mode. The "copy from pattern" mode was using a horizontal two-pixels pattern, we could use another similar mode where the pattern is a vertical two-pixels pattern or any other pattern. In the preferred embodiment, this second additional mode uses instead the penultimate position of the same pattern as the first additional mode, and the update process consists therefore in storing the last position (previously stored for the first mode) for this second mode (instead of the penultimate one, as the last position becomes the penultimate one), and the current position for the first mode.

Figure 25:
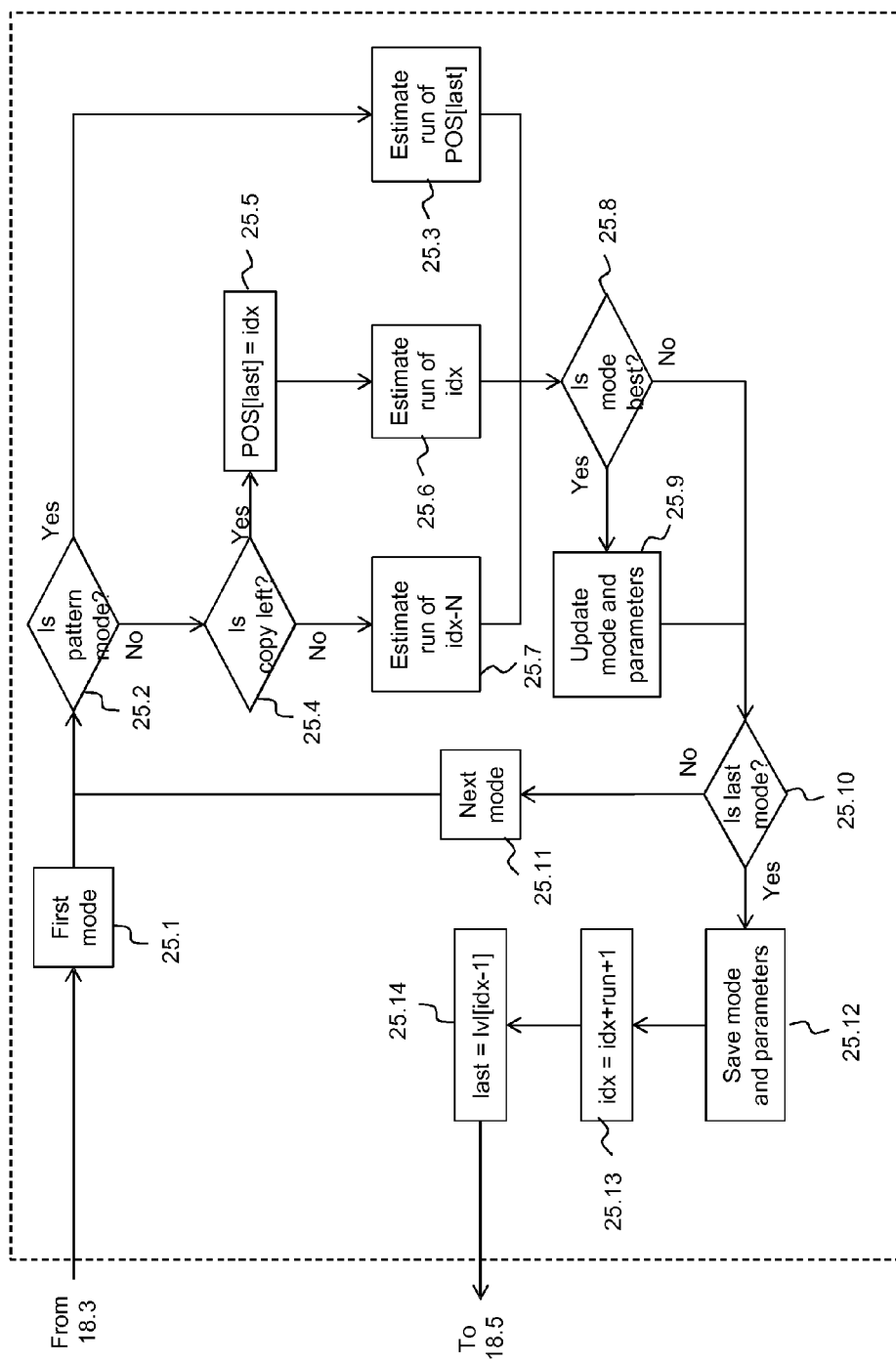
FIG. 25 illustrates more in detail another embodiment of the step for coding a "Level" in the Palette mode at the encoder side.

FIG. 25 illustrates more precisely the embodiment in the FIG. 21, assuming that:

there are at most 32 elements in the palette;

the pattern is the value of the index of the left (or last on the previous line) sample;

only one "copy from pattern" prediction mode is used;

the block has a width of N and is encoded in raster scan order defined above;

if the left sample is missing (e.g. at the start of the block) or does not have a level associated, then the pattern uses the default value of 32 (palette levels ranging from 0 to 31).

In addition it is defined:

"idx": the current position;

"lvl": an array containing the block indexes (and thus the level value for position idx is lvl[idx]);

"last": the pattern value (i.e. it should be equal to lvl[idx−1] if it exists, otherwise 32), as mentioned above, it is the value of the pixel prior in raster scan order to the current position, which we will refer to as "left";

"POS": the table containing the positions, and holding 33 elements (32 for each palette level possible plus 1 for the default value when no palette level exists). POS[val] corresponds to the position in the block of the value of the expected pixel for the pattern having a level "val". In other words, it is the position of the expected index for a pixel having a left neighbor of index "val". This is the position in the block from where indexes may be copied according to the run parameter. For example, POS[i]=j means that the expected index of a pixel with a left neighbor having an index i is the index lvl[j], the index of the pixel at position j.

In this specific embodiment, step 18.1 is modified to set "idx" to 0 (i.e. initial position), "last" to 32 (as it is missing) and let all values in "POS" equal to 0. Steps 25.1 and 25.2 are strictly identical to respectively 21.1 and 21.2. Given that we have already defined "last" as the index value on the left, steps 21.3 and 21.4 can be simplified to only getting the value of the position for "last", i.e. POS[last]. Therefore step 25.3 allows finding the value of the run starting from that position (and thus is equivalent to step 21.5 for the "copy from pattern" mode) before going to step 25.8, strict equivalent of 21.6.

If the current prediction mode is not the "copy from pattern" mode, then step 25.4 occurs and checks whether this mode is the "copy left" one. If such is the case, a step 25.5 specific to the invention occurs. This step was located previously within step 18.7: the position for the index value "last" is updated with the current position. In other words, the pattern corresponding to the left value is updated to expect the current value. Then step 25.6 evaluates the run for the "copy left" mode and is followed by step 25.8. If the current mode is not the "copy left" one, then the current mode is obviously the "copy from above" mode. Given the assumptions, the position above the current one is idx−N, therefore step 25.7 evaluates the run for copying from that position, and is followed by step 25.8.

As mentioned, steps 25.8 to 25.12 are respectively similar to steps 21.6 to 21.10. According to one specific embodiment the update process of 18.7 could be implemented as follows. Therefore step 25.13 updates the current position according to the run of the selected prediction mode (either "copy left", "copy from pattern" or "copy from above"), by incrementing it to the first non-coded position, i.e. idx+run+1. Step 25.14 then updates the value of "last" from the index on the left of the current position, which is now lvl[idx−1] since idx has been updated. The processing can then go back to step 18.5, which concludes this specific embodiment.

Figure 26:
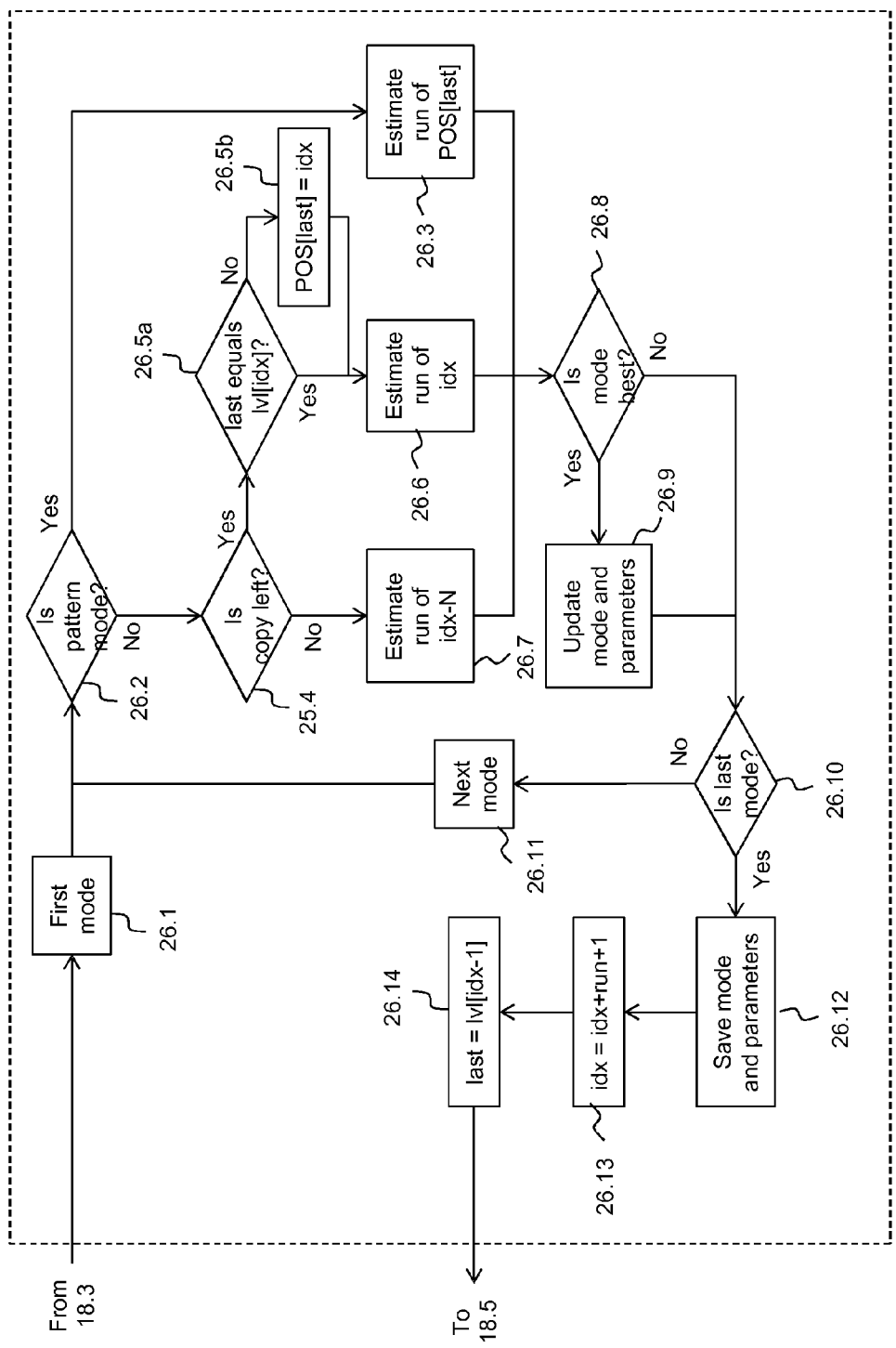
FIG. 26 represents an encoder performing a transition check compared to the embodiment of FIG. 25.

FIG. 26 presents a small improvement over the embodiment of FIG. 25 by performing an additional check in step 26.5a. As a consequence, every step in FIG. 25 corresponds to the step of same number in FIG. 26, except for step 25.5 that becomes step 26.5b. Indeed, step 25.5 unconditionally updated the stored position. But it may happen that the current level and the "last" level are identical, as may happen when e.g. a copy up mode is followed by a copy left mode. As a consequence, this does not correspond to an actual transition and provides no new information. Therefore step 26.5a checks whether there is an actual transition from "last". If such is the case, then step 26.5b can occur and the position for "last" is updated, otherwise, processing directly goes to step 26.6.

It is worth noting that, in that case, we consider patterns constituted by only one pixel being the left neighbor of the pixel to be predicted. The interest of pattern encoding is to rely on repetition of similar transitions in the image. Therefore, patterns are essentially useful to characterize transitions. A pattern based on a left value and having an expected value being identical to the left value does not correspond to an actual transition. By omitting to update the pattern when the "last" index is identical to the current index (lvl[idx]) the storage of such pattern, not corresponding to actual transition, is prevented. Patterns stored in the pattern table (POS table in this embodiment) correspond to actual transitions.

It is well understood that the conditional update embodied by step 26.5a is easily reported by the man skilled in the art in any of the steps 18.7, 22.13, 23.13 or 28.13, for use in combination with other embodiments of the pattern method.

Figure 27:
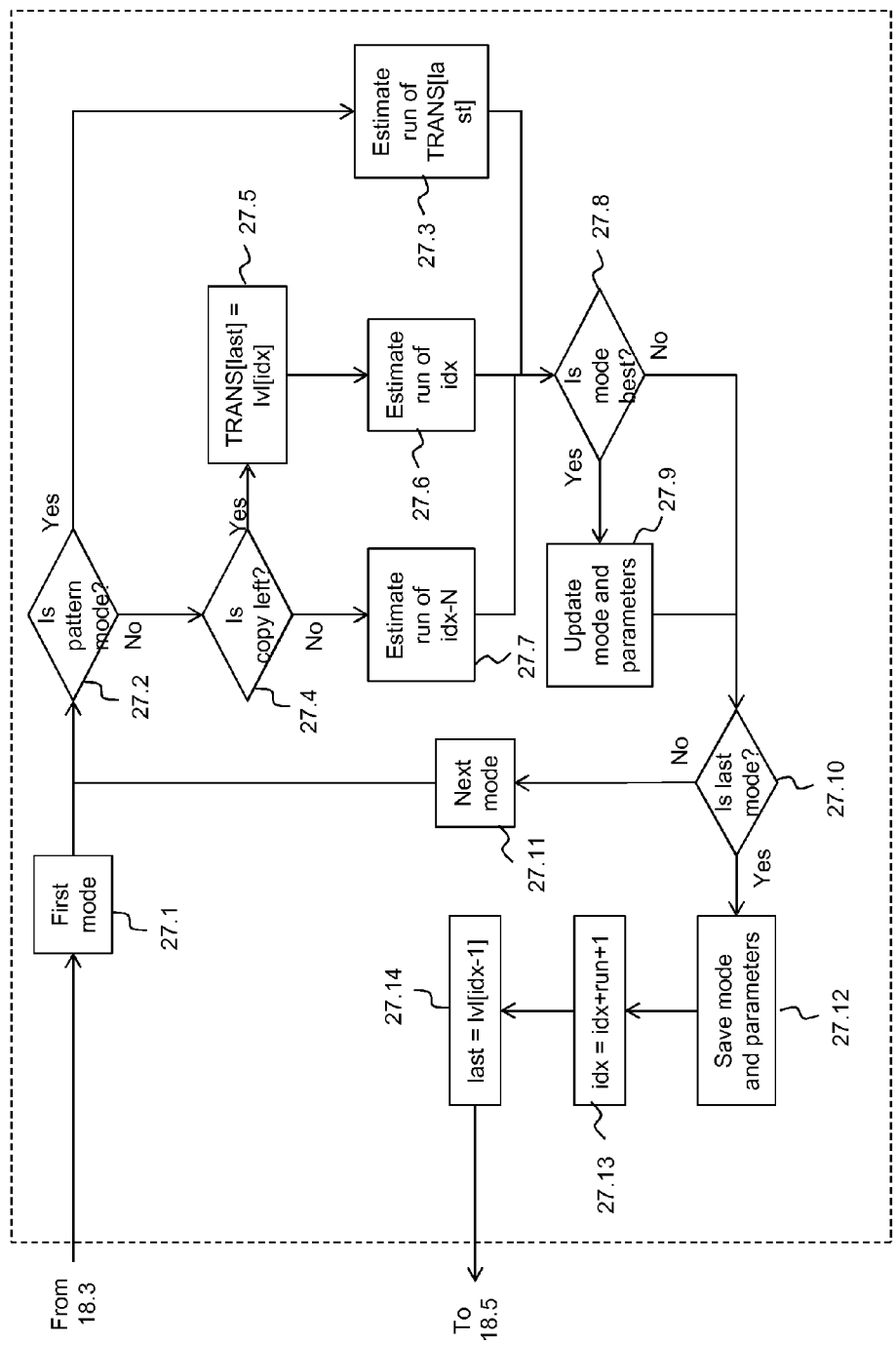
FIG. 27 illustrates an encoder having a pattern mode that relies on a pattern index table.

FIG. 27 presents the combination of methods from FIG. 25 and FIG. 19. A new "pattern mode", step 27.2, is introduced. In the previous mode, patterns were stored in a POS table giving the position in the block of the expected value for a given pattern identified by the index of the left neighbor. In the embodiment of FIG. 25, patterns are stored in a similar table called TRANS which gives directly the expected value instead of its position in the block. For example, TRANS[i]=j, means that the index j is expected when the left neighbor has an index of i.

As the pattern table TRANS does not contain actual positions in the block, the run parameter cannot be interpreted as the number of pixels that may be copied from the position of the pattern as it was in the previous embodiment. The run parameter retrieves in this embodiment the same meaning as in the classical copy-left mode (without pattern), namely it is a number of repetitions of the same index in the block. In this mode, the index of the current pixel is predicted according to the pattern, the number of repetition of this index is given by the run parameter.

As "last" still represent the index of the left neighbor of the current pixel (with the general meaning mentioned above), the expected index of the current pixel is given by the pattern table, TRANS[last], the run parameter is the number of repetition of this index, TRANS[last], from the current position.

This is therefore similar to a copy left method for which the level is deduced from the value of "last" and is therefore implicit. Compared to a pattern mode using table 17.b (e.g. as illustrated on FIG. 25), this has the benefit of reducing the size of the table needed to store patterns as only one column is stored indexed by the possible indexes of the left neighbor. Most of the description of FIGS. 21, 25 and 26 therefore may apply, e.g. the mode codewords of p.48, the update mechanisms and so on. As a consequence, most steps of FIG. 25 are identical to their same-numbered version in FIG. 27, except for steps 27.5 and 27.3. In step 27.5, instead of storing the position "idx", the level at this position is stored, e.g. in the pattern table TRANS. Therefore, step 27.3, instead of evaluating the copy from a position stored e.g. in the pattern table POS, evaluates the length of the run of pixels whose value is the one indicated by the right column in the pattern table TRANS. It can be seen from this embodiment that various possibilities exist by using this pattern approach.

Figure 22:
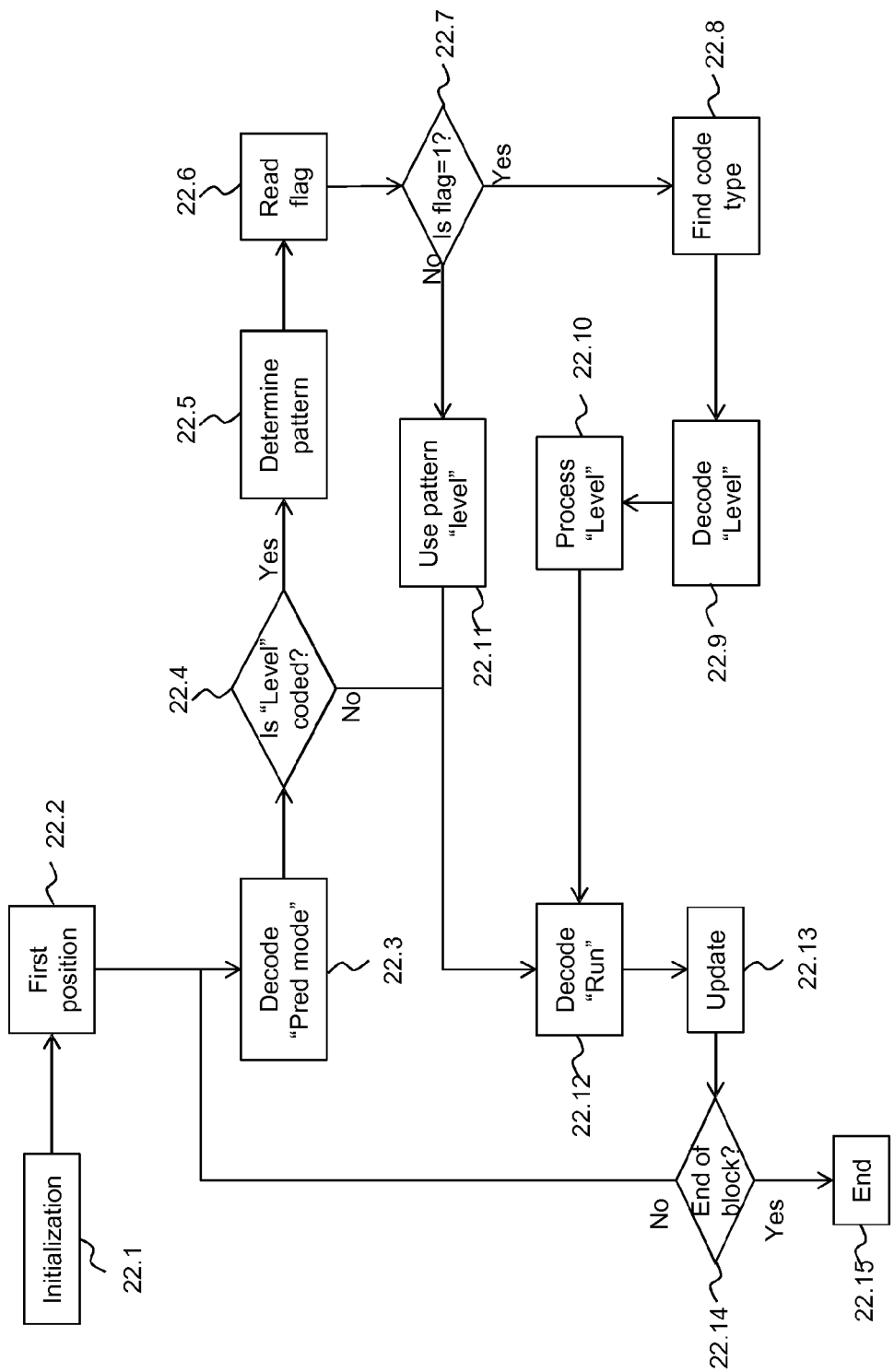
FIG. 22 illustrates a flowchart corresponding to the FIG. 19 at the decoder side.

FIG. 22 is the decoder version of FIG. 19. How it can be extended to support the encoder of FIG. 20 should be obvious to the man skilled in the art.

Step 22.1 initializes the decoding process, and it assumed that at least:
Any needed memory or buffer has been allocated;
The color palette (set of P colors) has been decoded.

The process then initializes the iterative decoding loop by setting the first position to decode on step 22.2. The "Pred mode" information is decoded at step 22.3, and it can then be determined whether a level must be decoded on step 22.4. If it is determined that no index needs to be decoded, then regular decoding occurs, employing e.g. the means of the regular method, as the mode is a copy mode (e.g. the "copy above" mode). In that case, decoding continues with step 22.12 where the length of the run is decoded.

Otherwise, specific operations take place by starting at step 22.5. The pattern is first determined on this step similar to 19.2, then a flag is decoded on step 22.6 corresponding to the information written by steps 19.11 and 19.7. This allows checking whether the flag indicates that the pattern "level" matches the "level" to decode on step 22.7. If such is the case, then step 22.11 occurs: and the "level" is set to be the one stored for the pattern. Otherwise, the index is explicitly coded and the decoder continues on step 22.8. There, the type of the entropy code for the index is determined similarly to 19.9 (e.g. an exponential Golomb code of order b/2).

This allows decoding the "level" in 22.9 using the determined entropy code. Step 22.10 undoes any processing of step 19.8. For instance, if the decoded "level" is superior or equal to the one stored for the pattern, then it means that the value was decremented by the encoder to generate shorter codewords, and the decoder then increments the decoded "level". As the "level" has been fully determined, the decoding continues on step 22.12 already described.

Once the length of the run has been decoded, step 22.13 occurs. Related to the invention, if a level had to be decoded, this level can be used to update the stored value for the pattern, as is described for step 18.7. Also, the current position is updated according to the run length. Then step 22.14 checks whether the end of the block has been reached: if such is the case, then the palette information has been fully decoded and the process ends at step 22.15, otherwise it loops back to 22.3 to continue decoding.

Figure 23:
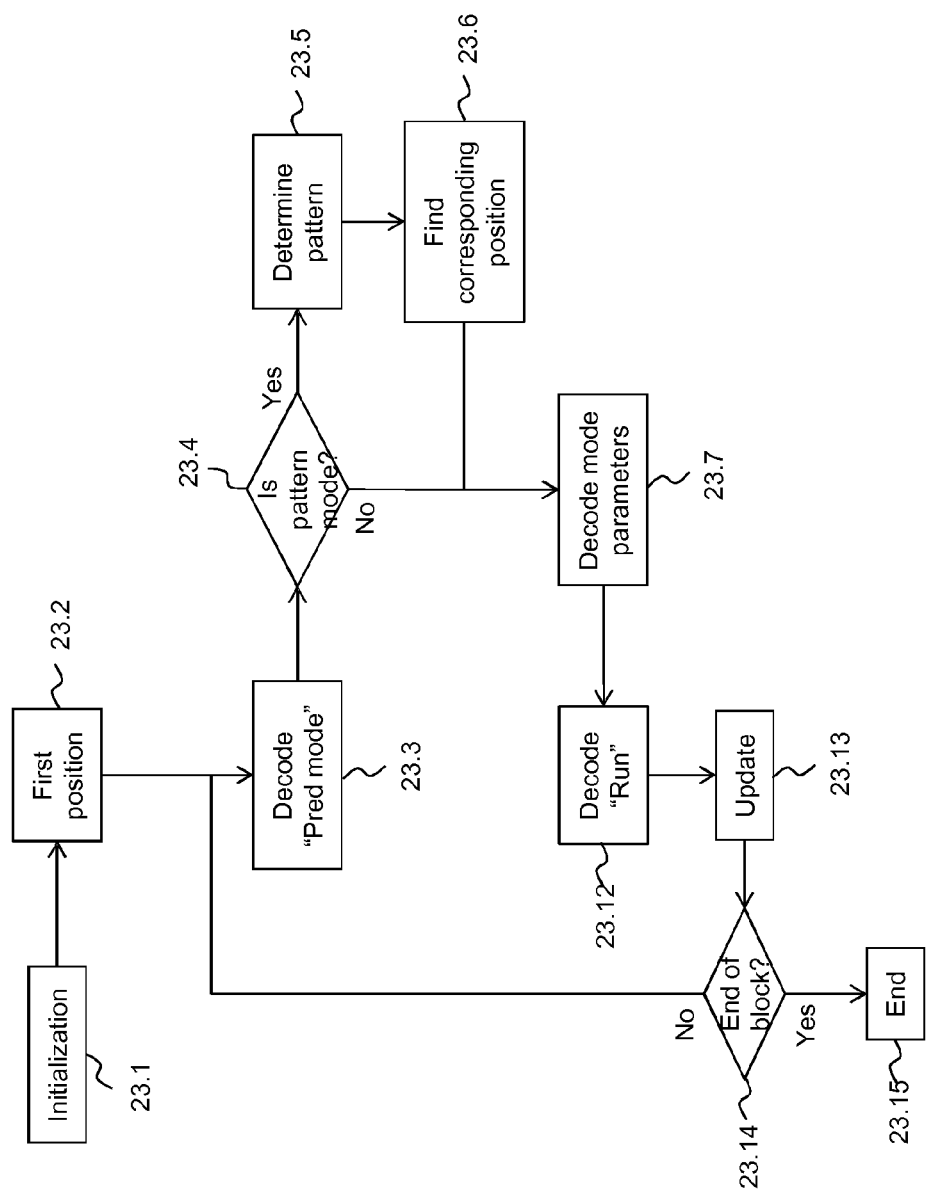
FIG. 23 illustrates a flowchart describing another embodiment of the Palette mode according to the invention for the encoder.
Figure 28:
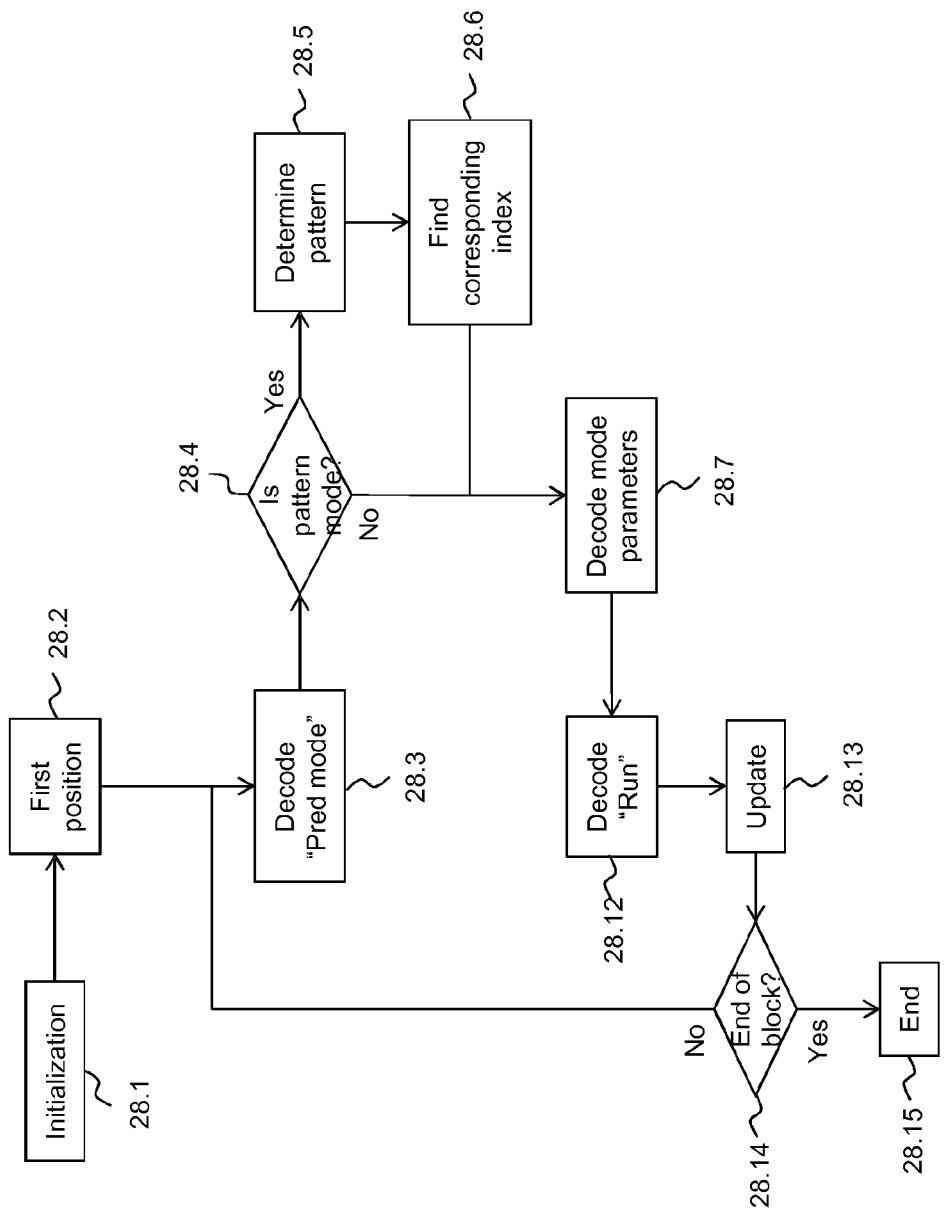
FIG. 28 illustrates the decoder associated to the encoder illustrated in FIG. 27.

FIG. 28 is almost identical to FIG. 23, except that, being the decoder associated to FIG. 27, steps 23.6 and 23.13 have to be modified. Indeed, step 28.6 now uses the index value associated to the pattern from e.g. the pattern table TRANS (instead of the position from e.g. the pattern table POS), and interprets the run value to be the number of times said index value is repeated. Consequently, the information stored is an index instead of a position, so step 28.13 may store index values instead of positions, using means disclosed in any of the preceding. In particular, one may imagine the equivalent of steps 26.5a and 26.5b for a decoder: if the decode mode is "copy left", and the decoded index is different from the "last" value, then the pattern table may be updated.

Figure 29:
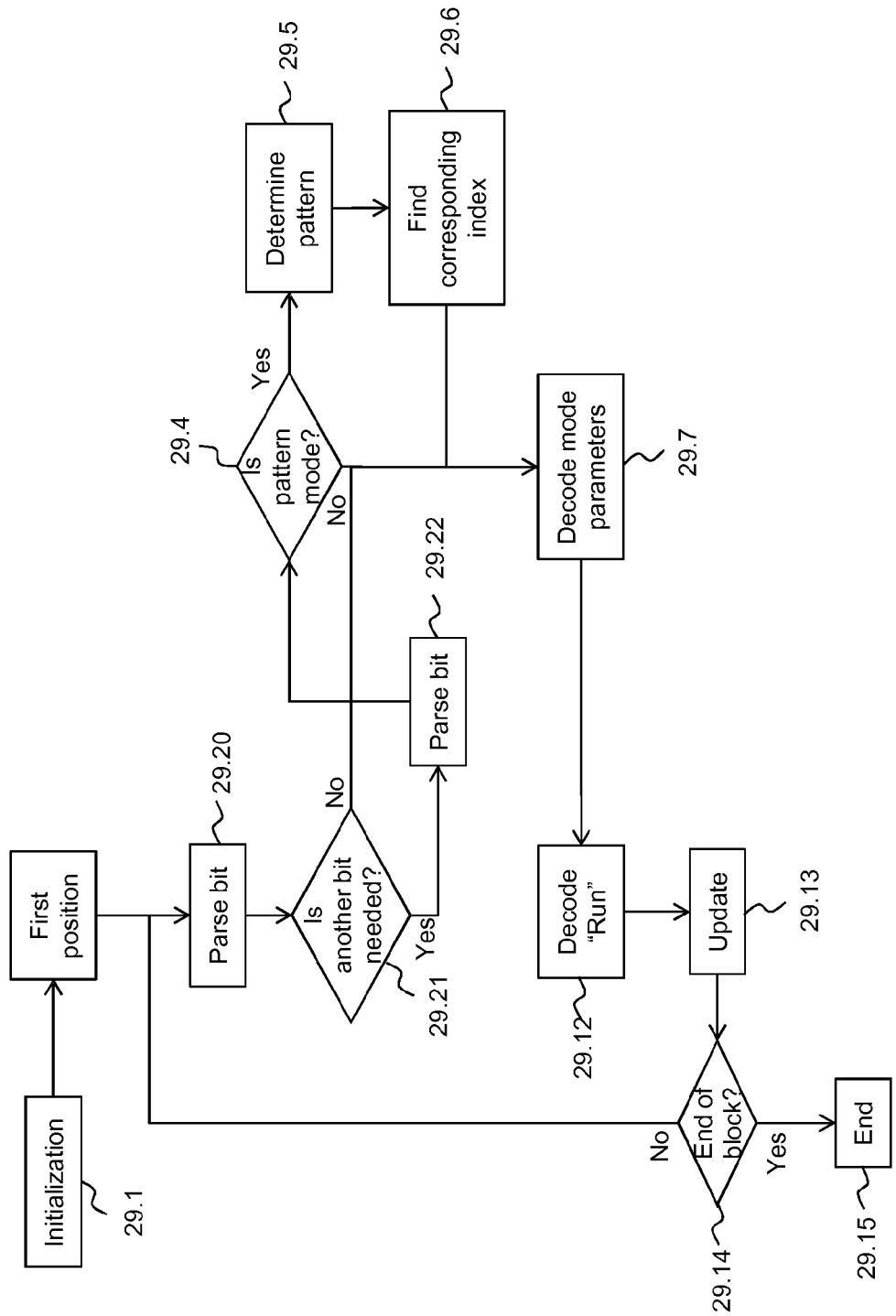
FIG. 29 illustrates a decoder implementing a more efficient signalling method of the transition.

The embodiment in FIG. 29 is similar to the embodiment illustrated in FIG. 28, but it provides a more efficient way of signaling the "copy transition" mode. Indeed, the "copy transition" mode signaling is sometimes redundant. For instance, if it indicates the same level as another available mode for Palette prediction, e.g. the "copy above" mode (and/or the level above if it exists), it is highly unlikely that the "copy transition" mode will improve the coding efficiency. In that case, it is then more efficient to change the signaling of the "copy transition" mode depicted in Table 1 to the signaling shown in Table 2.

A first embodiment even comprises the disabling of the "copy transition" mode and therefore removes its corresponding signaling. As a consequence, the signaling of the three prediction modes use a variable amount of bits, as depicted by the two configurations illustrated by the two columns of Table 2.

TABLE 2

Alternative codewords associated to each mode

| Mode | Transition off Codeword | Transition on Codeword |
|---|---|---|
| left prediction (index mode) | 0 | 00 |
| Copy transition | N/A | 01 |
| Copy above | 1 | 1 |

Going back to FIG. 29, all steps in are identical to FIG. 28, except step 28.3 has been replaced by steps 29.20 to 29.22. Step 29.20 parses information partially indicating the prediction mode. In a preferred embodiment, this first bit is parsed and it indicates whether the mode is the "copy above" mode. Then, step 29.21 checks if further decoded information is needed to determine the mode.

In a first embodiment, step 29.21 consists in checking whether the transition level TRANS[last] previous to the current level (in the processing order) is identical to the level above the current level, if available. If the answer is positive, then it is considered that the "copy transition" mode is "off" and therefore no additional bit is needed to be parsed and decoded: this configuration corresponds to the codewords as defined in the first column ("Transition off") of Table 2. In this case, the next step is directly step 29.7. Otherwise if the level TRANS[last] (meaning the level obtained with the "copy transition" mode) is different from the level above, we consider that the "transition copy" mode may exist and the second bit should be parsed and decoded. Consequently, it means for this case, that the three modes are available and the codewords associated to the three modes are illustrated by the last column ("Transition on") of Table 2.

If the codewords are switched for the "transition copy" mode (then "1") and the copy above mode (then "0"), the first example would consist in comparing TRANS[last] to the level obtained with the index mode (instead of the level above) after having checked this value.

In a further embodiment, to illustrate the selection between the two configurations of the Table 2, the second bit is parsed only if the number of elements in the palette is above a given threshold. In a preferred embodiment, the threshold is 3.

In a yet further embodiment, to illustrate the selection between the two configurations of the Table 2, the second bit is parsed only if the occurrence of the copy transition mode obtained on past decoded CUs is superior to a given threshold. Then as depicted in the above examples, more information is parsed and decoded in step 29.22.

In a preferred embodiment, the additional decoded information is a second bit as presented.

Whether more information was needed or not, once prediction mode has been fully parsed, processing can resume on step 29.4 which is identical to step 28.4.

In yet another embodiment, the codewords 00, 01 and 1 are kept for respectively representing the "left prediction" (index mode), the "copy transition" and the "copy above" modes as illustrated in Table 2 in the column "Transition on", and the context of the second bit depends on the copy transition mode occurrence.

In a preferred embodiment the context of the second bit depends on if the number of elements to code with the "copy transition" mode are below a threshold, and/or if the transition level equals to the level of the copy above mode, if available.

In any case, it is advantageous when the first bit signals whether the prediction mode is "copy above" or not. Indeed its parsing requires no dependency since it can be parsed and decoded independently. This is not the case of the second bit which depends on the value of the first bit.

In a further embodiment related to the entropy coding/decoding method, the entropy coding/decoding method used for generating the corresponding bitstream of the mode is based on a Context-Adaptive Binary Arithmetic Coding (CABAC) method and the context associated to the second bit of the codeword differs from the first bit.

In a first variation of this embodiment the context of the second bit is fixed and independent of the context of the first bit.

In a second variation, the context depends on whether the transition is unlikely i.e., as previously described, whether TRANS[last] is equal to the level above (if it exists) and/or whether the palette size is below a threshold.

In a preferred embodiment, this is a separate context dedicated to the signaling of the "copy transition" mode. For example, this context may depend on the number of elements to code or on the levels associated to the pattern.

FIG. 23 is partly similar to FIG. 22: steps 23.4 to 23.6 and 23.13 contain the described embodiment of the invention, while the others are similar.

At step 23.3, the "Pred mode" is decoded according to the way it was encoded on step 21.10. Step 23.4 can check whether it is a "copy from pattern" mode. If it is not, then process goes directly to step 23.7. Otherwise, the decoder determines on step 23.5 the pattern for the current position similarly to 21.3, and retrieves the position corresponding to this mode and pattern on step 23.6. For instance, two tables may be used, the first by a first "copy from pattern" mode, and the second by a second one. The specific parameters of the current "copy from pattern" mode have now been determined.

The decoder then decodes any further parameters needed by the current mode during step 23.7. For instance, in the "prediction left" mode, the index must be decoded following the coding method used in 18.5, or in relation to FIG. 19 or FIG. 20. In any described embodiments, the "prediction left" mode is the only copy mode requiring the direct encoding of the level in the bitstream.

Once all the mode parameters have been decoded and determined, step 23.13, similar to how step 18.7 was described in the foregoing. This implies updating the current position, and also updating the positions stored for each mode and the corresponding pattern. For instance, the current position can be used to update the position stored for a first mode and pattern, and the former position for said first mode and pattern is used to update the position for a second mode and the same pattern.

Afterwards, step 23.14 occurs: the updated position is compared to the end of block. If it is reached, the decoding of the levels ends at step 23.15, otherwise it loops back to step 23.3.

Figure 24:
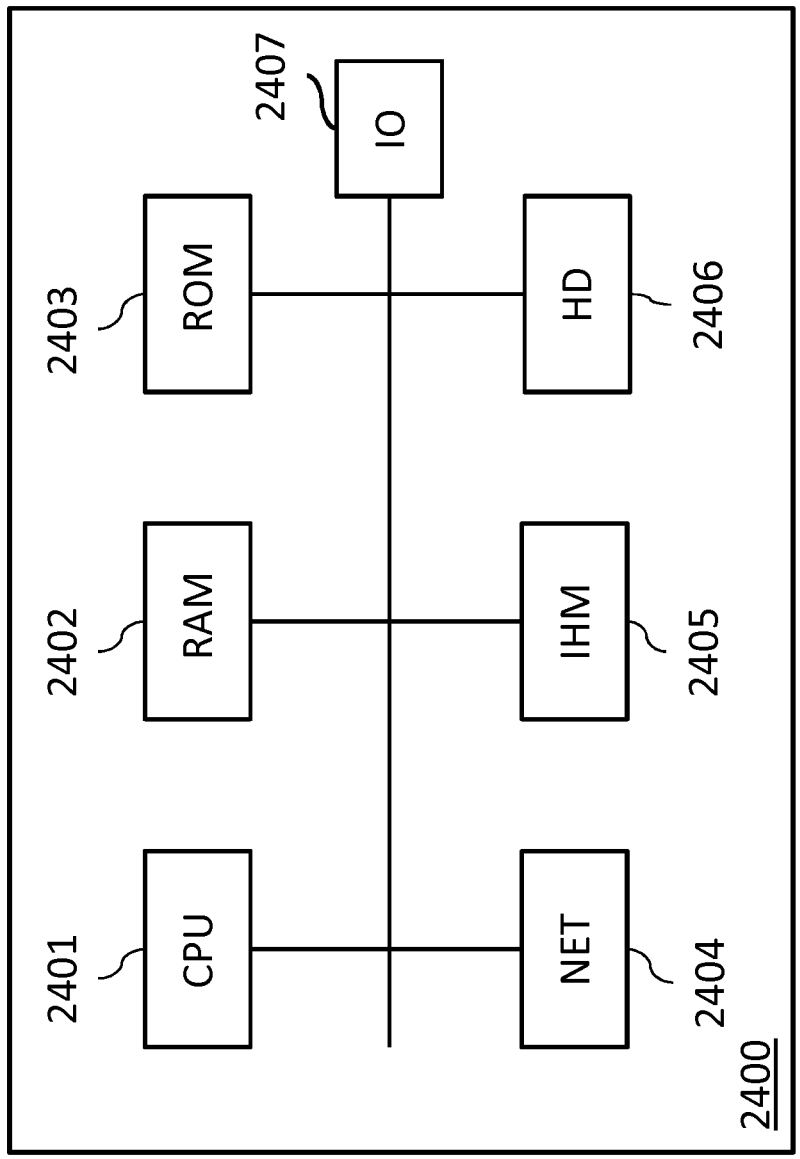
FIG. 24 illustrates a schematic block diagram of a computing device.

FIG. 24 is a schematic block diagram of a computing device 2400 for implementation of one or more embodiments of the invention. The computing device 2400 may be a device such as a micro-computer, a workstation or a light portable device. The computing device 2400 comprises a communication bus connected to:

- a central processing unit 2401, such as a microprocessor, denoted CPU;
- a random access memory 2402, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;
- a read only memory 2403, denoted ROM, for storing computer programs for implementing embodiments of the invention;
- a network interface 2404 is typically connected to a communication network over which digital data to be processed are transmitted or received. The network interface 2404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 2401;
- a user interface 2405 may be used for receiving inputs from a user or to display information to a user;
- a hard disk 2406 denoted HD may be provided as a mass storage device;
- an I/O module 2407 may be used for receiving/sending data from/to external devices such as a video source or display.

The executable code may be stored either in read only memory 2403, on the hard disk 2406 or on a removable digital medium such as for example a disk. According to a variant, the executable code of the programs can be received by means of a communication network, via the network interface 2404, in order to be stored in one of the storage means of the communication device 2400, such as the hard disk 2406, before being executed.

The central processing unit 2401 is adapted to control and direct the execution of the instructions or portions of software code of the program or programs according to embodiments of the invention, which instructions are stored in one of the aforementioned storage means. After powering on, the CPU 2401 is capable of executing instructions from main RAM memory 2402 relating to a software application after those instructions have been loaded from the program ROM 2403 or the hard-disc (HD) 2406 for example. Such a software application, when executed by the CPU 2401, causes the steps of the flowcharts shown in FIGS. 10 to 23 to be performed.

Any step of the algorithm shown in FIGS. 10 to 23 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for decoding a block of indexes used for decoding a coding unit of an image according to a palette, each index being related to one of the pixels forming the coding unit, the palette comprising a set of indexes associated to pixel values, wherein the method comprises:
   storing at least one pattern constituted by the indexes of at least one neighbour of an index of the block of indexes, said pattern being associated with at least one prediction index corresponding to an index expected at a location in the neighbourhood of the pattern;
   identifying for a current index to be decoded in the block of indexes a stored pattern corresponding to the neighbourhood of the current index; and
   decoding the index of the current index by reference to the stored pattern.

2. A method according to claim 1, wherein said patterns are constituted by the index of the left neighbour of the current index.

3. A method according to claim 2, wherein storing at least one pattern consists in storing the prediction index in a table indexed by the possible indexes of the left neighbour.

4. A method according to claim 3, wherein a prediction index in said table is initialized with an initialization value which is the index having occurred most frequently for a given index of the left neighbour.

5. A method according to claim 3, wherein said table is initialized with a same initialization value for each prediction index or with a same initialization value for each prediction index except one.

6. A method according to claim 4, wherein said table is initialized for each coding unit except when the palette used for encoding a current coding unit is the same as the palette used for encoding the previous coding unit.

7. A method according to claim 1, wherein the method further comprises:
   updating said prediction index associated with the stored pattern with the current index.

8. A method according to claim 7, wherein said pattern being constituted by the left neighbour of the current index, the updating step is omitted if the index of said left neighbour is equal to the current index.

9. A method according to claim 7, wherein said updating step is done only when the index to be decoded does not correspond to said prediction index associated to the stored pattern a predefined number of times, said index to be decoded being the same each time.

10. A method according to claim 1, wherein decoding the current index by reference to said corresponding stored pattern comprises:
    decoding information signalling that the index is to be retrieved using a stored pattern.

11. A method according to claim 1, further comprising selecting a coding mode among a set of pre-defined coding modes including the pattern mode, and encoding an information for signalling the selected coding mode.

12. A method according to claim 11, wherein the set of predefined coding modes comprises two modes and wherein the pattern mode may be deactivated according to a predefined criterion, the coding mode selected among the two modes being encoded with an information comprising only one bit if said pattern mode is deactivated.

13. A method according to claim 12, wherein the two coding modes are the index mode and the copy above mode.

14. A method according to claim 12, wherein said predetermined criterion is based on the comparison of the coded index value obtained with the pattern mode and the coded index value obtained with the copy above mode, said pattern mode being deactivated if the obtained coded index values are the same.

15. A method according to claim 13, wherein the copy above mode is always encoded with the bit "1", regardless of whether the pattern mode is deactivated or not.

16. A method according to claim 11, wherein if the information used for signalling the selected mode is encoded with more than one bit, each bit being obtained based on a CABAC context, the context being fixed and independent for each bit.

17. A method for encoding a block of indexes used for encoding a coding unit of an image according to a palette, each index being related to one of the pixels forming the coding unit, the palette comprising a set of indexes associated to pixel values, wherein the method comprises:
    storing at least one pattern constituted by the indexes of at least one neighbour of an index of the block of indexes, said pattern being associated with at least one prediction index corresponding to an index expected at a location in the neighbourhood of the pattern;
    identifying for a current index to be encoded in the block of indexes a stored pattern corresponding to the neighbourhood of the current index; and
    if the index to be encoded corresponds to said prediction index associated to the stored pattern then encoding the index of the current index by reference to the stored pattern.

18. A non-transitory computer-readable storage medium storing instructions of a computer program for implementing a method according to claim 1.

* * * * *